United States Patent
Aoyama et al.

(10) Patent No.: US 11,669,975 B2
(45) Date of Patent: Jun. 6, 2023

(54) SUBJECT TRACKING DEVICE, SUBJECT TRACKING METHOD, AND IMAGING APPARATUS

(71) Applicant: CANON KABUSHIKI KAISHA, Tokyo (JP)

(72) Inventors: Yuuzou Aoyama, Kanagawa (JP); Tatsuya Yamazaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/364,025

(22) Filed: Jun. 30, 2021

(65) Prior Publication Data
US 2022/0005205 A1    Jan. 6, 2022

(30) Foreign Application Priority Data

Jul. 6, 2020  (JP) .............................. JP2020-116449

(51) Int. Cl.
| | | |
|---|---|---|
| *G06T 7/20* | (2017.01) | |
| *G06T 7/70* | (2017.01) | |
| *G06T 7/246* | (2017.01) | |
| *H04N 23/63* | (2023.01) | |
| *H04N 23/68* | (2023.01) | |
| *H04N 23/67* | (2023.01) | |
| *H04N 23/611* | (2023.01) | |

(52) U.S. Cl.
CPC .................. *G06T 7/20* (2013.01); *G06T 7/70* (2017.01); *H04N 23/611* (2023.01); *H04N 23/635* (2023.01); *H04N 23/6812* (2023.01); *G06T 2207/30201* (2013.01); *H04N 23/675* (2023.01)

(58) Field of Classification Search
None
See application file for complete search history.

(56) References Cited

U.S. PATENT DOCUMENTS

| | | | |
|---|---|---|---|
| 8,224,172 B2 | 7/2012 | Sasaki | |
| 2015/0154452 A1* | 6/2015 | Bentley | G11B 27/022 386/201 |
| 2018/0343442 A1* | 11/2018 | Yoshikawa | H04N 13/117 |
| 2020/0265649 A1* | 8/2020 | Chaurasia | G06F 3/011 |
| 2020/0401793 A1* | 12/2020 | Leung | G06T 7/292 |

FOREIGN PATENT DOCUMENTS

| | | |
|---|---|---|
| JP | 2011-133821 A | 7/2011 |
| JP | 2015-012493 A | 1/2015 |

\* cited by examiner

*Primary Examiner* — Hung Q Dang
(74) *Attorney, Agent, or Firm* — Cowan, Liebowitz & Latman, P.C.

(57) ABSTRACT

An imaging apparatus includes a subject detection unit that detects a subject using an image signal output by an image sensor and a motion vector detection unit that detects a motion vector of the subject from the image signal. A camera control unit performs a process of recognizing a movement pattern using the motion vector of the detected subject and determines a group movement scene if it is determined that a movement of a plurality of subjects is a linear movement and the number of subjects with the same movement pattern is equal to or greater than a predetermined number. The camera control unit sets the subject in the lead in the movement direction among the plurality of subjects performing the liner movement in the determined group movement scene to a tracking target as a main subject.

19 Claims, 15 Drawing Sheets

| | MOVEMENT PATTERN | FACE SIZE | CLOSEST SIDE |
|---|---|---|---|
| SUBJECT A | LINEAR MOVEMENT: APPROACH DIRECTION | 10 | THIRD |
| SUBJECT B | LINEAR MOVEMENT: APPROACH DIRECTION | 9 | FIFTH |
| SUBJECT C | LINEAR MOVEMENT: APPROACH DIRECTION | 11 | FOURTH |
| SUBJECT D | LINEAR MOVEMENT: APPROACH DIRECTION | 12 | SECOND |
| SUBJECT E | STATIONARY STATE | 10 | FIRST |

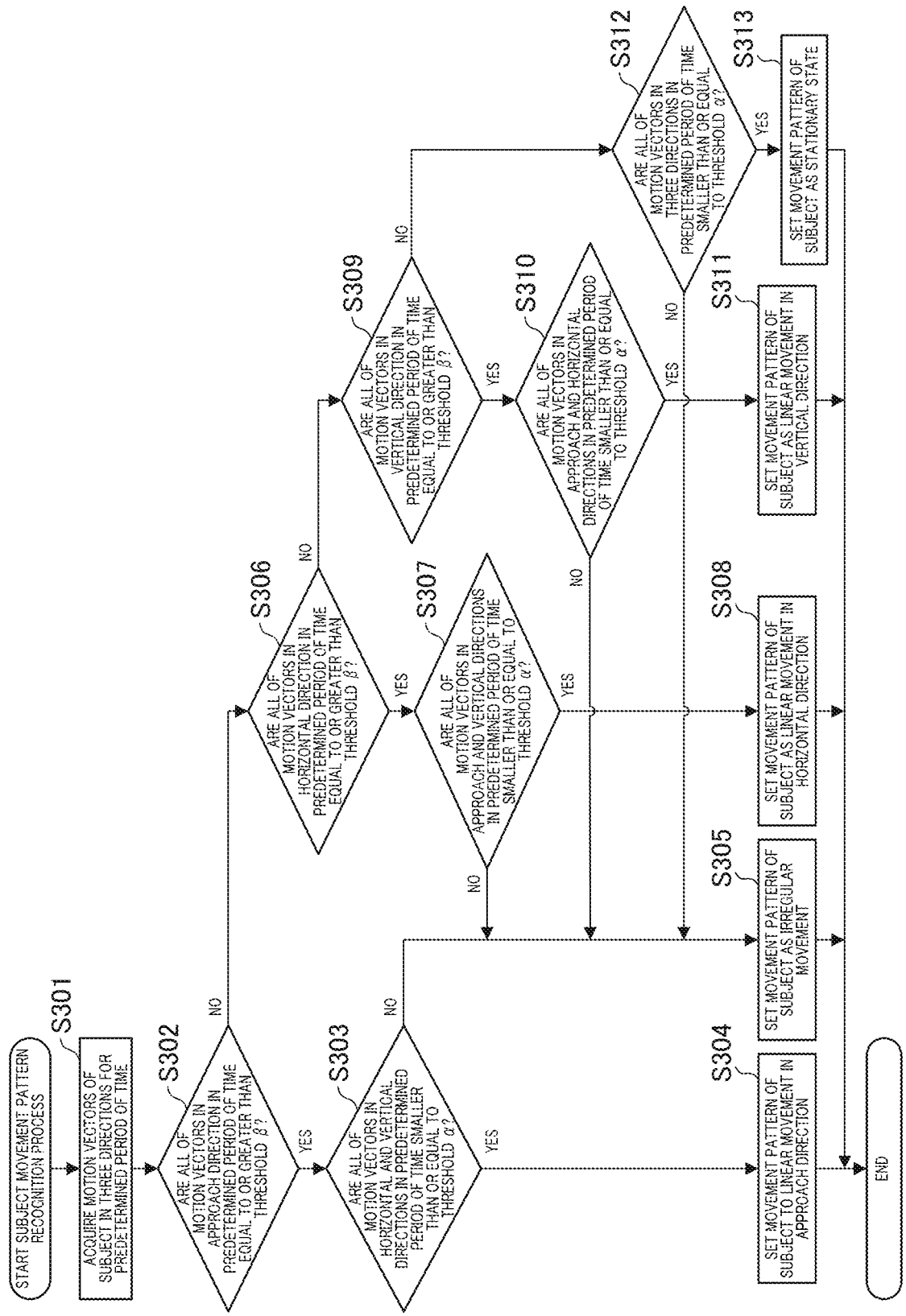

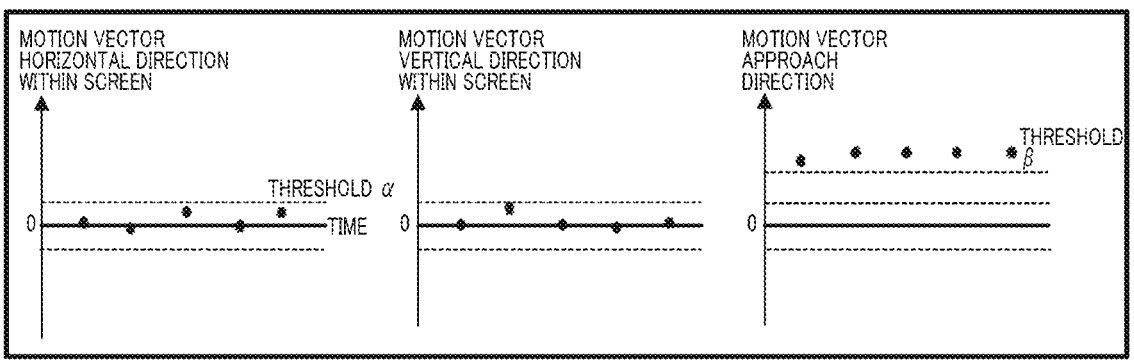
FIG. 6A   MOVEMENT PATTERN = LINEAR MOVEMENT IN APPROACH DIRECTION
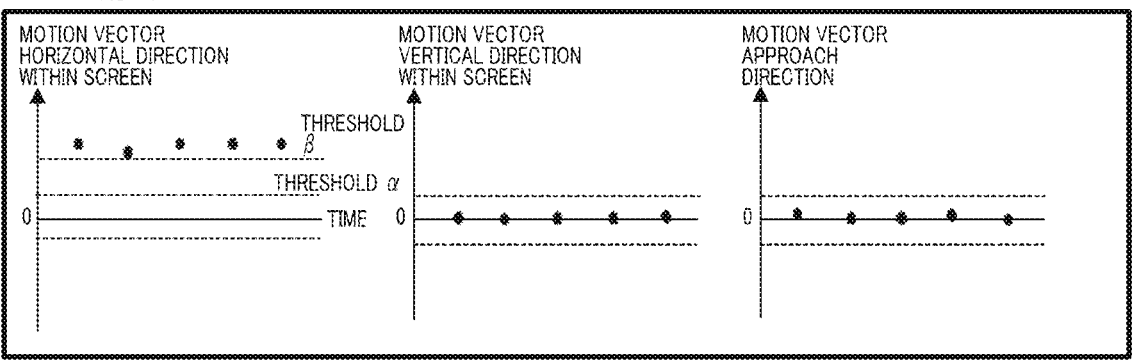
FIG. 6B   MOVEMENT PATTERN = LINEAR MOVEMENT IN HORIZONTAL DIRECTION
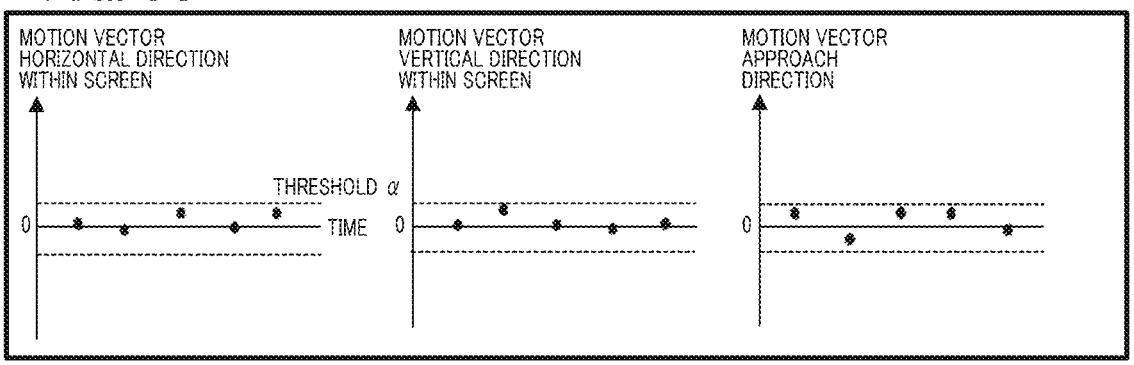
FIG. 6C   MOVEMENT PATTERN = STATIONARY STATE
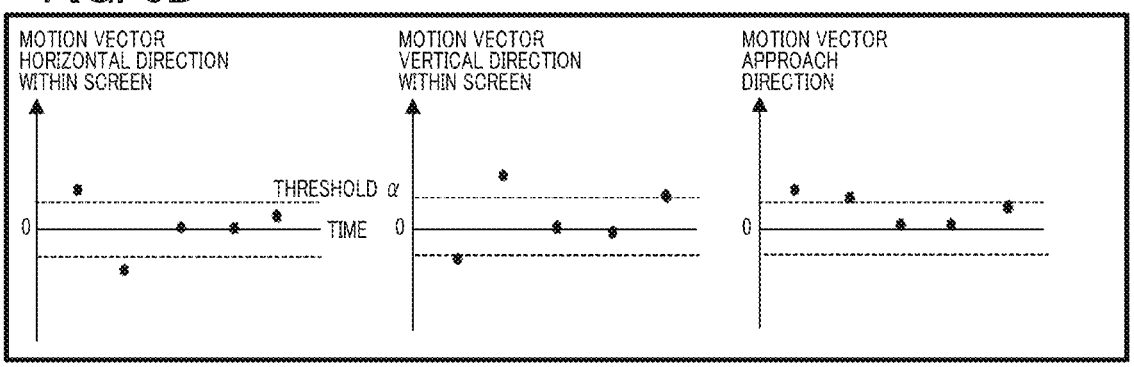
FIG. 6D   MOVEMENT PATTERN = IRREGULAR MOVEMENT

SUBJECT TRACKING DEVICE, SUBJECT TRACKING METHOD, AND IMAGING APPARATUS

BACKGROUND OF THE INVENTION

Field of the Invention

The present invention relates to a technique of deciding on a specific subject (a main subject) among a plurality of subjects which are moving bodies and tracking the subject.

Description of the Related Art

An imaging apparatus with a subject tracking function, such as a digital camera, can detect and track a subject using image signals continuously output from the image sensor. Auto-focusing is set on the detected subject, and the subject is photographed by adjusting brightness, color, and the like to be in favorable states. General subjects to be detected may be the face and the body of a person, an animal such as a dog or a cat, and a vehicle such as a car or a motorcycle. A technique of tracking a subject selected based on the intention of a photographer and photographing the subject in a focused state when a plurality of subjects are detected has been proposed.

Japanese Patent Laid-Open No. 2011-133821 discloses an auto-focus system in which the face of a person can be set as a tracking target with a simple operation. When a photographer performs a focusing operation, a best focus range in the photographing screen is detected, and if there is the face of a person set as a subject in the best focus range, the subject is automatically tracked. In addition, Japanese Patent Laid-Open No. 2015-12493 discloses a technique of designating an appropriate tracking target from information of images captured in time series. A first area and a second area containing the first area are set on a photographing screen, and if a state in which a tracking target is detected outside the second area continues for a predetermined period of time, a subject included in the first area is designated as a new tracking target.

Using the techniques of the related art, it is difficult for a photographer to track a subject that the photographer wants to capture in a photographing scene assumed in photography of sports such as racing, in which a plurality of subjects make vigorous movements. In photography of sports in which the lead player of the game continuously changes due to overtaking, tracking of a subject needs to be controlled according to the ever-changing situation.

SUMMARY OF THE INVENTION

A device according to an embodiment of the present invention is a subject tracking device that detects a subject from a captured image and controls tracking of the subject, the subject tracking device including an acquisition unit that acquires an image signal of the image, a first detection unit that detects a subject from an image area within the image and acquires detection information of the subject, a second detection unit that detects an amount of a motion of the subject from the acquired image signal, and a control unit that recognizes a movement of the subject from the detected amount of the motion of the subject and controls tracking of a main subject decided using the detection information of the subject. When a plurality of moving subjects are detected, the control unit performs a process of deciding on a subject that is in the lead in a movement direction as the main subject.

Further features of the present invention will become apparent from the following description of exemplary embodiments with reference to the attached drawings.

BRIEF DESCRIPTION OF THE DRAWINGS

FIG. 5 is a flowchart explaining a subject motion pattern recognition process.

FIGS. 6A to 6D are diagrams describing relationships between motion vectors and motion patterns of a subject.

DESCRIPTION OF THE EMBODIMENTS

Embodiments of the present invention will be described in detail below with reference to the accompanying drawings. A technical task of a subject tracking device provided in an imaging apparatus to determine a main subject in sport photography will be described before describing each embodiment.

Figure 7A:
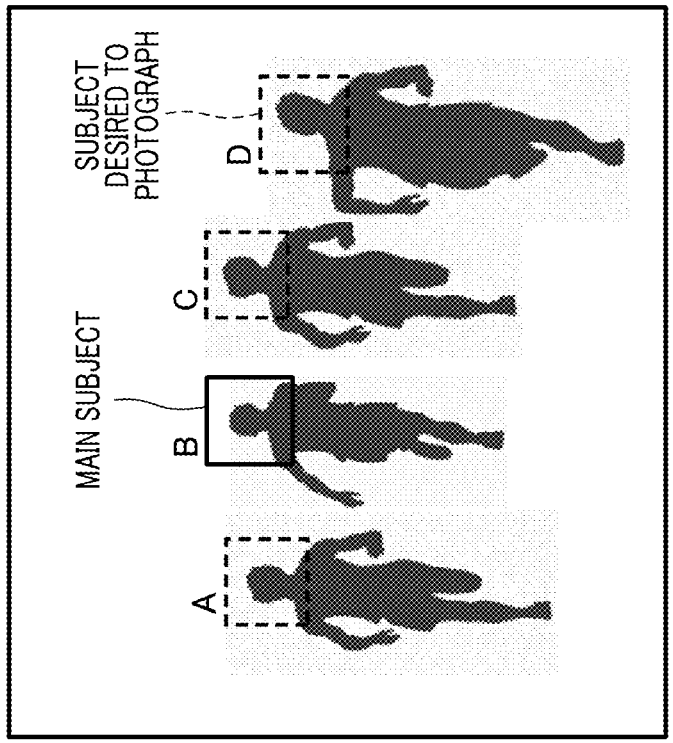
FIGS. 7A and 7B are diagrams describing a task in determining a main subject in sport photography.
Figure 7B:
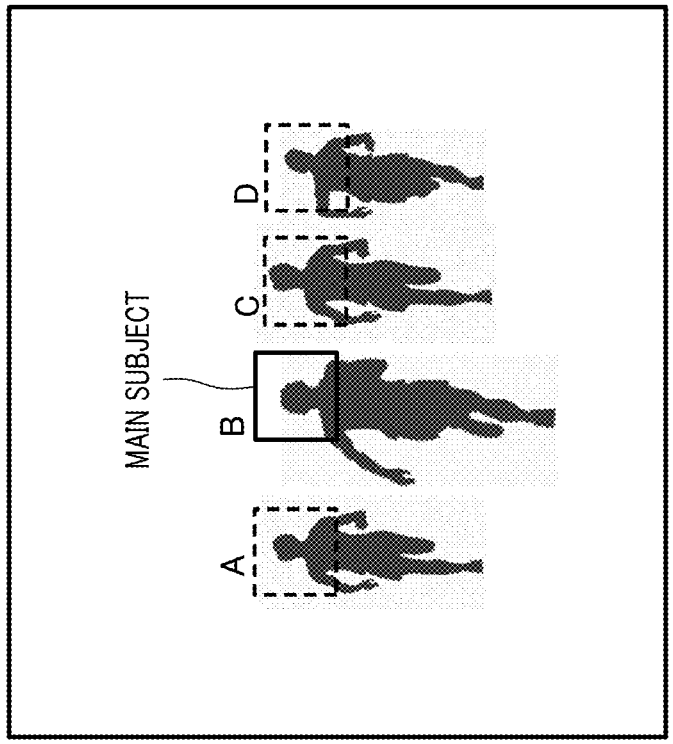

FIGS. 7A and 7B are diagrams schematically illustrating images of scenes obtained by capturing a plurality of runners from the front in athletics. The direction in which each subject moves is the approach direction (the direction in which the subject got closer to the imaging apparatus). A system in which a subject can be detected and tracked in the entire screen and a subject that is close to the center of the screen among a plurality of subjects is determined as a main subject that is the tracking target is assumed. The subject that photographers intend to capture in most cases of photographing scenes in athletics is the lead runner. For this reason, it is required to automatically recognize the lead subject and perform tracking control.

FIG. 7A illustrates an example of an image in which competing subjects A to D were captured. The subject B among the four people was running in the lead and the position of the subject B was the closest to the center of the screen. Thus, the subject B was determined as the main subject and tracking of the subject was possible according to the intention of the photographer.

FIG. 7B illustrates an example of an image captured after a certain period of time elapsed from the capturing time point of the image of FIG. 7A. The subject D became the lead runner after overtaking the subject B, and thus the main target that the photographer intended to capture was switched to the subject D. Meanwhile, the subject B was still located close to the center of the screen, remaining as a main subject. Thus, it was not possible to track the subject D who the photographer wanted to capture.

Although the examples of the scenes in which the plurality of competing runners were captured from the front are illustrated in FIGS. 7A and 7B, control of accurately tracking the lead runner is required even in a situation in which a plurality of subjects are captured in the horizontal direction or an oblique direction. As described above, a subject suitable for a photographing scene in which a plurality of subjects move is difficult to track using only a method of determining a main subject with reference to the position or the area of the subject in the screen. In photography of sports in which the lead player of the game continuously changes due to a plurality of subjects being close to and overtaking each other, a subject is required to be tracked according to a situation changing in a short period of time.

Embodiments of the present invention show an example of an imaging apparatus provided with a subject tracking device that enables a subject to be determined as a tracking target according to an intention of a photographer in a scene in which a plurality of subjects are moving.

First Embodiment

Figure 1:
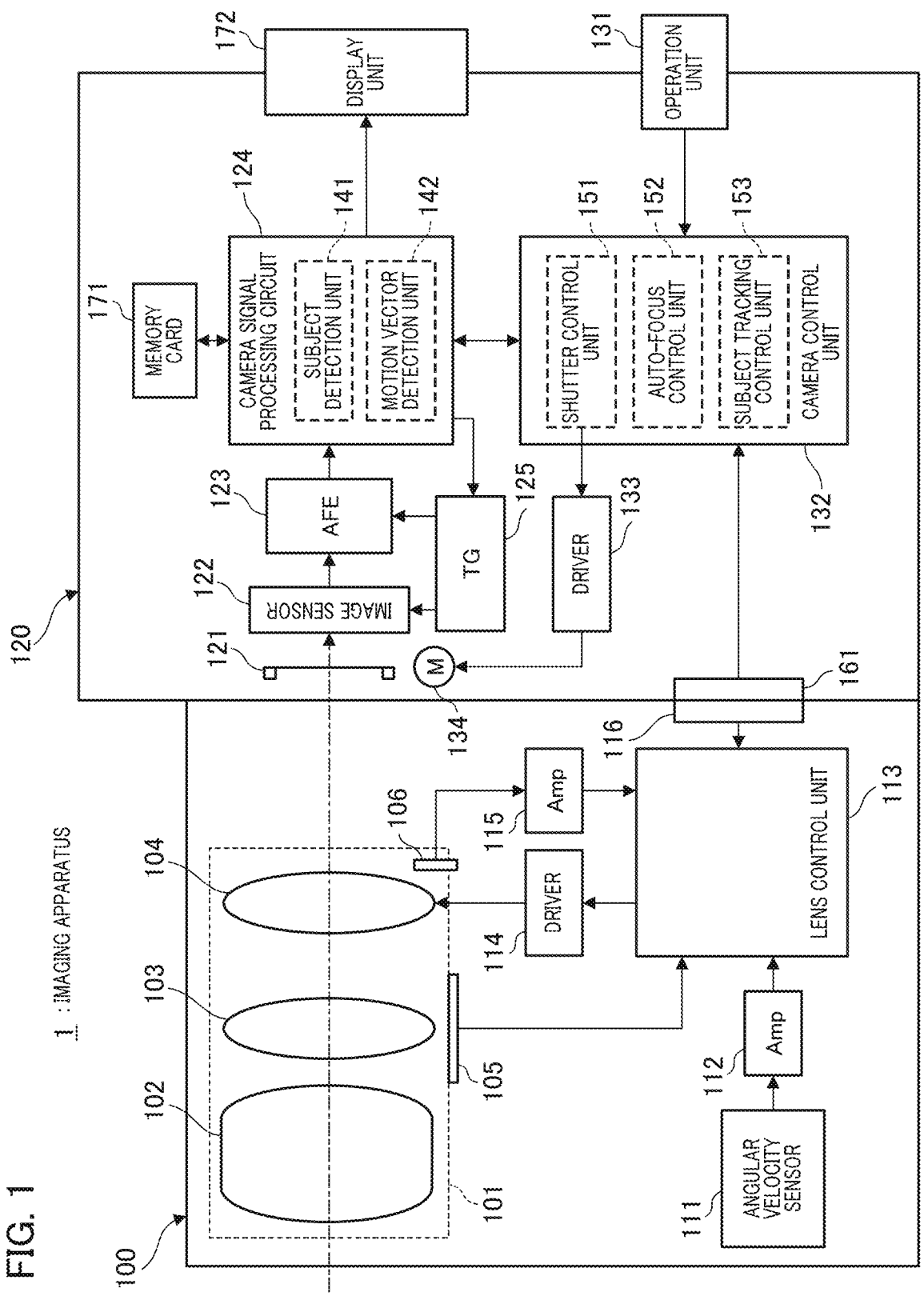
FIG. 1 is a block diagram illustrating a configuration of an imaging apparatus according to a first embodiment.

FIG. 1 is a block diagram illustrating a configuration of an imaging apparatus 1 according to the present embodiment. The present embodiment introduces an example of an imaging system constituted by an interchangeable lens 100 and a camera body part (which will be referred to simply as a body part) 120. The embodiment is not limited thereto and can be applied to a digital camera, a video camera, and a film-based still camera that are made by integrating the lens part and the body part and a mobile apparatus with an imaging function such as a smartphone. A positional relation of each part will be described below by defining the subject side as the front side.

The interchangeable lens 100 includes a photographing lens part 101. The photographing lens part 101 includes a main imaging optical system 102, a zoom lens group 103, and a shift lens group 104 in order from the front side. The main imaging optical system 102 includes a plurality of lenses. The zoom lens group 103 is a lens group that can change focal distances. The shift lens group 104 is a lens group constituting an image blur correction system that corrects image blur with respect to the optical axis caused by shake of the imaging apparatus 1. The shift lens group 104 optically corrects image blur, for example by moving the direction perpendicular to the optical axis of the imaging optical system.

A zoom encoder 105 detects a position of the zoom lens group 103 and outputs a position detection signal to a lens system control microcomputer (which will be referred to as a lens control unit) 113. An angular velocity sensor 111 detects shake of the imaging apparatus 1 and outputs an angular velocity signal that is a shake detection signal to an amplifier 112. The amplifier 112 amplifies the output of the angular velocity sensor 111 and outputs the signal to the lens control unit 113.

A position sensor 106 detects a position of the shift lens group 104 and outputs the position detection signal to another amplifier 115. The amplifier 115 amplifies the output of the position sensor 106 and outputs the signal to the lens control unit 113. The lens control unit 113 controls driving of the shift lens group 104 via a driver 114 based on the position detection signal of the shift lens group 104.

The interchangeable lens 100 includes a mount contact point part 116 for connection to the body part 120. Another mount contact point part 161 is provided in the body part 120. The lens control unit 113 can communicate with a camera system control microcomputer (which will be referred to as a camera control unit) 132 included in the body part 120 via the mount contact point parts 116 and 161 in a state in which the interchangeable lens 100 is attached to the body part 120.

The body part 120 includes a shutter 121, an image sensor 122 such as a complementary metal oxide semiconductor (CMOS) image sensor, an analog signal processing circuit (AFE) 123, and a camera signal processing circuit 124. The analog signal processing circuit 123 acquires an output signal of the image sensor 122, processes the analog signal, and outputs the signal to the camera signal processing circuit 124. The camera signal processing circuit 124 includes a subject detection unit 141 and a motion vector detection unit 142. The subject detection unit 141 detects a subject based on an image signal. The motion vector detection unit 142 detects motion vectors in the horizontal direction, the vertical direction, and the approach direction based on a plurality of image signals with different imaging times.

In addition, the body part 120 includes a timing generator (TG) 125 and a camera operation unit 131. The timing generator 125 sets an operation timing of the image sensor 122 and the analog signal processing circuit 123. The camera operation unit 131 includes a power switch, a release switch, a switch for operating a change in settings for photographing, and the like and outputs an operation input signal to the camera control unit 132.

The camera control unit 132 controls the entire image apparatus 1. The camera control unit 132 includes a shutter control unit 151, an auto-focus control unit 152, and a subject tracking control unit 153. The shutter control unit 151 controls operations of the shutter 121. A driver 133 drives a shutter drive motor 134 for causing the shutter to operate according to a control signal from the shutter control unit 151. The auto-focus control unit 152 transmits a control command signal to the lens control unit 113 to control adjustment of the focus of the imaging optical system. The subject tracking control unit 153 determines a main subject, controls tracking of a subject, and the like. There are various known methods for the subject tracking technique of detecting a main subject that is a moving body and capturing the subject within an angle of view. Processing performed by each of the control units of the camera control unit 132 is realized by a central processing unit (CPU) provided in the camera control unit 132 executing a predetermined program.

The body part 120 includes the mount contact point part 161 for the interchangeable lens 100. The camera control unit 132 and the lens control unit 113 can perform serial communication with each other via the mount contact point parts 116 and 161 at a predetermined timing.

A memory card 171 has a storage medium that stores data of captured videos. A display unit 172 is provided with a display device such as a liquid crystal panel (LCD). The display unit 172 displays an image to be captured so as to be monitored, images of subjects to be photographed, and the like.

Next, an operation of the imaging apparatus 1 will be described. When the camera operation unit 131 is operated and the imaging apparatus 1 is turned on, the camera control unit 132 detects a state change. The camera control unit 132 performs power supply and an initial setting with respect to each circuit part constituting the imaging system. When the interchangeable lens 100 is attached to the body part 120 and the mount contact point parts 116 and 161 are electrically connected, power is supplied from the body part 120 to the interchangeable lens 100, and the lens control unit 113 makes an initial setting for the interchangeable lens 100. Then, the lens control unit 113 and the camera control unit 132 starts communication at a predetermined timing.

In the camera signal processing circuit 124, the subject detection unit 141 detects a subject from the image signal acquired by the image sensor 122, and the motion vector detection unit 142 detects a motion vector from a plurality of images with different imaging times.

When the subject tracking control unit 153 determines a main subject serving as the tracking target, the display unit 172 displays a video and a frame for the main subject. A photographer starts a photographing operation while being able to visually recognize the main subject based on the displayed frame. The camera operation unit 131 has a two stage-type release switch to be turned on and off with an operation of a release button. When a user presses the release button halfway, the interchangeable lens 100 is controlled through the lens control unit 113 from the auto-focus control unit 152. The lens control unit 113 controls a focus lens, which is not illustrated, constituting the imaging optical system and causes the main subject to be focused on to set a focus state. In addition, if the user presses the release button fully, the shutter control unit 151 controls the shutter 121 to perform photographing processing. The analog signal processing circuit 123 acquires a signal output from the image sensor 122 to perform image processing, and the image data processed by the camera signal processing circuit 124 is displayed by the display unit 172 and stored in the memory card 171.

Next, a main subject decision process to determine a subject more suitable for the intention of a photographer will be described exemplifying a photographing scene in which a plurality of subjects linearly move, typified by athletics, or the like.

Figure 2:
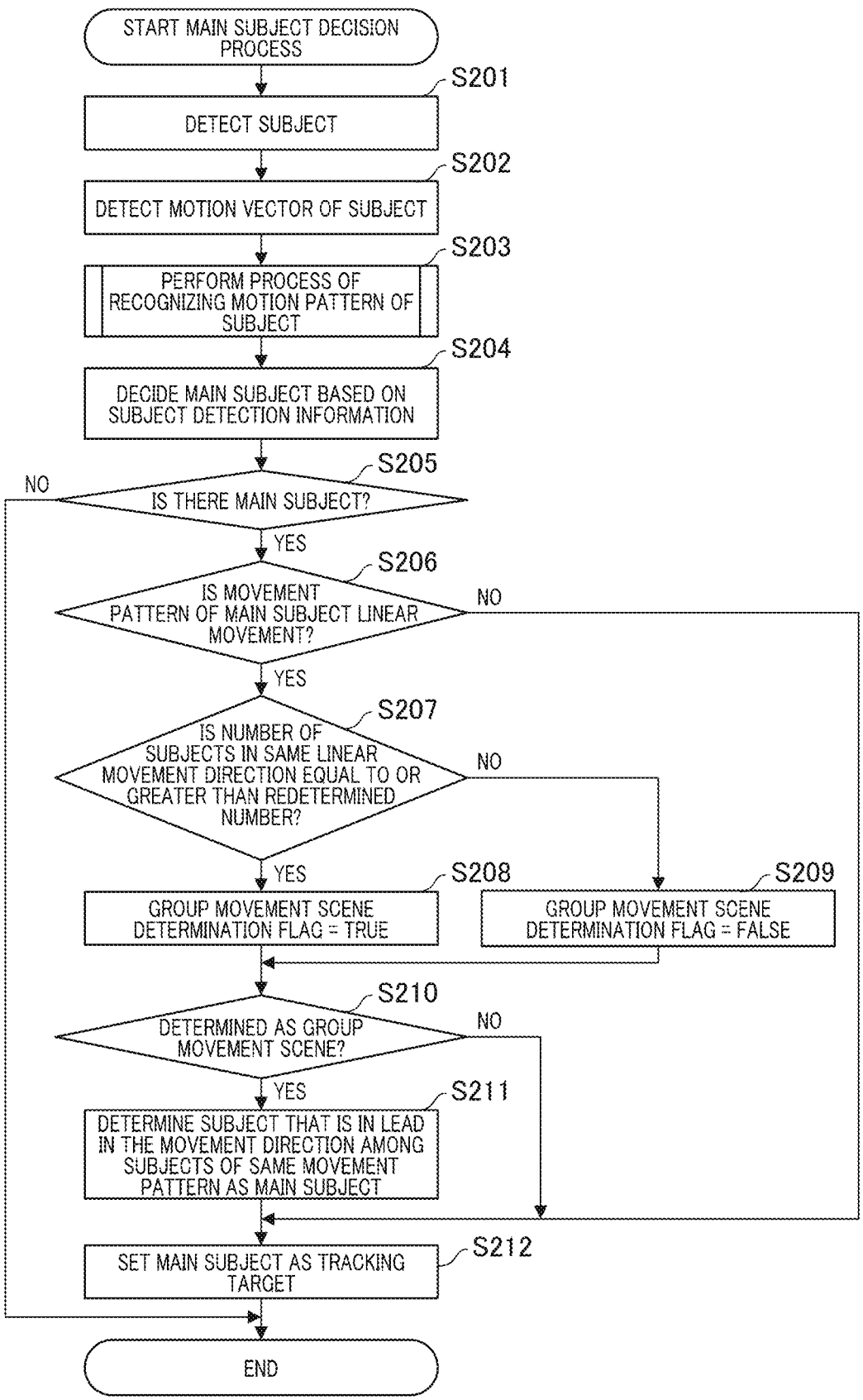
FIG. 2 is a flowchart explaining a main subject decision process according to the first embodiment.

FIG. 2 is flowchart explaining the main subject decision process. A timing at which the present process starts is a timing at which, for example, power of the camera is turned on and an image signal is output to the camera signal processing circuit 124. Alternatively, the process may be started after the camera operation unit 131 receives an operation to select a main subject.

In S201, the subject detection unit 141 detects an image area of the subject included in an image based on an image signal output from the image sensor 122 to generate subject detection information. The subject detection information includes information of the type (whether the subject is a person, an animal, or a vehicle), a portion (the pupils, the face, or the body), a position, a size, and the like of the subject.

In S202, the motion vector detection unit 142 detects a magnitude and a direction of a motion vector of a subject image included in entire images. A motion vector detection process is performed based on the result of block matching between a current image signal and an image signal immediately before that, an amount of defocus in the image, and the subject detection information generated by the subject detection unit 141.

In S203, the subject tracking control unit 153 recognizes movement patterns of all subjects detected from the subject motion pattern recognition process, which will be described below. With respect to the movement patterns of the subjects, a linear movement in the horizontal direction, a linear movement in the vertical direction, a linear movement in the approach direction, and the like may be detected. Further, the movement patterns are assumed to include a stationary state.

In S204, the subject tracking control unit 153 decides a main subject using the subject detection information generated in S201. A method of determining a main subject is not limited to a particular method. For example, a method based on subject type information, a method of prioritizing a subject with a large size, a method of prioritizing a subject at a position close to the center of the screen, and the like are possible. The subject tracking control unit 153 determines a main subject suitable for a photographing state or settings of a photographing mode.

In S205, the subject tracking control unit 153 determines whether a main subject can be found in the main subject decision process of S204. If it is determined that there is no main subject, it is not possible to find a main subject that can be tracked, and the process ends. In addition, if it is determined that there is a main subject, the process proceeds to S206.

In S206, the subject tracking control unit 153 determines whether a movement pattern of the main subject recognized in S203 is a linear movement. If it is determined that the movement of the main subject is not a linear movement, it is determined that the movement scene is not one in the middle of racing. In this case, the process proceeds to S212 to track the main subject decided in S204. In S212, the subject tracking control unit 153 sets the main subject as a tracking target, and the process ends.

On the other hand, if it is determined that the movement of the main subject is a linear movement in S206, the process proceeds to S207. The process of S207 is to determine whether the movement scene is one in the middle of the racing. In S207, the subject tracking control unit 153 determines whether there are a predetermined number of subjects or more making linear movements in the same direction, that is, whether the number of subjects moving in the same movement direction is equal to or greater than a threshold. The predetermined number is a threshold for determining the number of subjects and may be a fixed value or a variable value according to a game or the like. If it is determined that there are the predetermined number of subjects or more with the same movement pattern, the movement scene is determined to be a group movement scene in which the subjects are racing. In this case, the process proceeds to S208. In addition, if it is determined that the number of subjects with the same movement pattern is less than the predetermined number, the process proceeds to S209.

It is characteristic in determination of a plurality of competing subjects that the plurality of subjects are of the same type (a human competes with a human). For this reason, a subject of a different type (e.g., a dog) from the main subject (e.g., a human) is excluded from determination targets of a group movement scene.

In S208, the subject tracking control unit 153 sets a predetermined flag (which will be referred to as a "group movement scene determination flag" below) to TRUE (a true value). In S209, the group movement scene determination flag is set to FALSE (a false value). After the process of S208 or S209, the process proceeds to S210.

In S210, the subject tracking control unit 153 determines whether the movement scene in the middle of the current racing is a group movement scene. If a value of the group movement scene determination flag is FALSE, the process proceeds to S212 and the tracking control for the current main subject is continued. In addition, if a value of the group movement scene determination flag is TRUE, the process proceeds to S211. This is to re-select a main subject suitable for the current state of the movement scene.

In S211, the subject tracking control unit 153 determines a subject that is in the lead in the movement direction among the plurality of subjects making the linear movements in the same direction. The subject tracking control unit 153 determines the subject that is in the lead as a main subject. In S212, the subject tracking control unit 153 sets the determined main subject as a tracking target, and then the series of processes ends.

Figure 3:
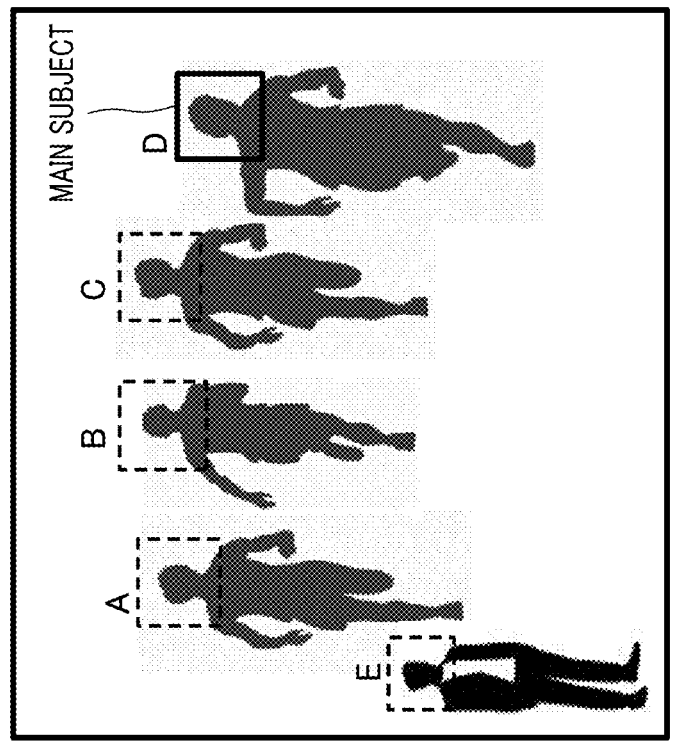
FIG. 3 is a diagram explaining a main subject decision process for a linear motion pattern in the approach direction.

FIG. 3 is a diagram schematically illustrating a group movement scene in which a plurality of subjects are performing linear movement in the approach direction. The drawing illustrates an example of an image of subjects A to E on the left side and shows movement patterns, face sizes, and approach rankings of the subjects on the right side. The subjects A to D are subjects (e.g., runners) performing group movement in the approach direction. The subject E is a stationary subject (a referee, etc.). Because the group movement is being made in the approach direction, the closest subject performing the linear movement is determined as the lead subject and thus determined as a main subject. However, because the closest subject E is stationary, it is excluded from the target to be a main subject. In the main subject decision process, it is determined which subject is in the closest distance based on the face size of the subject or the amount of defocus. The subject tracking control unit 153 determines the moving subject D that is determined to be at the closest position as a main subject.

Figure 4:
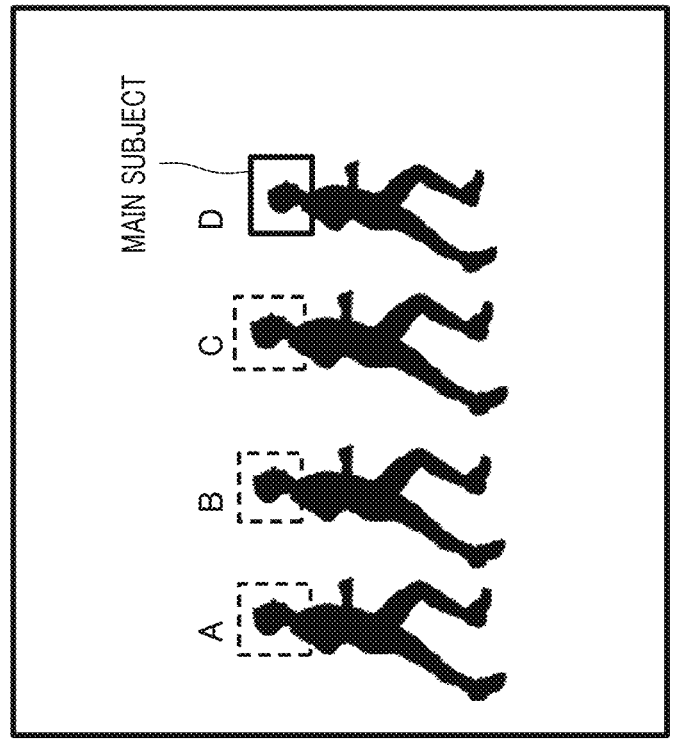
FIG. 4 is a diagram explaining a main subject decision process for a linear motion pattern in the horizontal direction.

FIG. 4 is a diagram schematically illustrating a group movement scene in which the plurality of subjects are performing linear movement in the right direction. The drawing illustrates an example of an image of the subjects A to E on the left side and shows movement patterns and approach rankings of the subjects at the positions from the right end of the screen on the right side. The subjects A to D are subjects performing group movement in the right direction. Because the direction of the group movement is the right direction, the subject D present at the rightmost position is judged as the lead subject and thus determined as a main subject. Here, although the subject that is in the lead in the movement direction is determined as a main subject in the present embodiment for the purpose of capturing the person advancing to the top position in the photographing scene of the sport, the present invention is not limited to the same purpose or the same control. A main subject may be determined through comprehensive evaluation in combination with, for example, other determination conditions by giving the greatest weight to the lead of a subject group in the movement direction and sequentially giving lesser weights to the following subjects (information of whether the face or the entire body was able to be detected, information that another subject near the center or of the past has been continuously tracked, etc.). In addition, for example, the last subject in the movement direction may be determined as a main subject or a large weight for a main subject evaluation may be given thereto for the purpose of capturing the subject lagging behind the group, or the like. As described above, the present invention includes various kinds of control as long as the control is to determine a main subject based on a movement direction of a group indicated by a plurality of subjects.

The subject motion pattern recognition process (S203 of FIG. 2) will be described with reference to the flowchart of FIG. 5 and FIGS. 6A to 6D. FIGS. 6A to 6D are diagrams expressing how motion vectors of one subject changes in a time series manner in a predetermined period of time for each movement pattern of the subject. The horizontal axis represents the passage of time, and the vertical axis represents an amount of a motion vector of a subject.

First, in S301, pieces of information of motion vectors of a subject in three directions within the screen for consecutive predetermined periods of time are acquired. The three directions are the horizontal direction (the X direction), the vertical direction (the Y direction), and the approach direction. FIGS. 6A to 6D show examples in which information of the motion vectors of the subject acquired for five consecutive frames is used.

In S302, a process of determining whether all of the motion vectors in the approach direction in a predetermined period of time are equal to or greater than a threshold (denoted by $\beta$) is performed. If it is determined that all of the motion vectors in the approach direction in the predetermined period of time are equal to or greater than the threshold $\beta$, the process proceeds to S303. In addition, if it is determined that any of the motion vectors in the approach direction in the predetermined period of time is not equal to or greater than the threshold $\beta$, the process proceeds to S306.

In S303, a process of determining whether all of the motion vectors in the horizontal direction and the vertical direction in the predetermined period of time are smaller than or equal to a threshold (denoted by $\alpha$) is performed. If it is determined that all of the motion vectors in the horizontal direction and the vertical direction in the predetermined period of time are smaller than or equal to the threshold $\alpha$, the vectors are in the state of FIG. 6A. In this case, the process proceeds to S304 to perform a process of setting the movement pattern of the subject as linear movement in the approach direction. In addition, if it is determined that any of the motion vectors in the horizontal direction and the vertical direction in the predetermined period of time is not smaller than or equal to the threshold $\alpha$, the process proceeds to S305. Because the movement of the subject is non-linear irregular movement as illustrated in FIG. 6D, a process of setting the movement pattern of the subject as irregular movement is performed in S305.

In S306, a process of determining whether all of the motion vectors in the horizontal direction in the predetermined period of time are equal to or greater than the threshold $\beta$ is performed. If it is determined that all of the motion vectors in the horizontal direction in the predetermined period of time are equal to or greater than the threshold $\beta$, the process proceeds to S307. In addition, if it is determined that all of the motion vectors in the horizontal direction in the predetermined period of time are not equal to or greater than the threshold $\beta$, the process proceeds to S309.

In S307, a process of determining whether all of the motion vectors in the approach direction and the vertical direction in the predetermined period of time are smaller than or equal to the threshold $\alpha$ is performed. If it is determined that all of the motion vectors in the approach direction and the vertical direction in the predetermined period of time are smaller than or equal to the threshold $\alpha$, the vectors are in the state of FIG. 6B. In this case, the process proceeds to S308 to perform a process of setting the movement pattern of the subject as linear movement in the horizontal direction. In addition, if it is determined that any of the motion vectors in the approach direction and the vertical direction in the predetermined period of time is not smaller than or equal to the threshold α, the process proceeds to S305, and a process of setting the movement pattern of the subject as irregular movement is performed.

In S309, a process of determining whether all of the motion vectors in the vertical direction in the predetermined period of time are equal to or greater than the threshold β is performed. If it is determined that all of the motion vectors in the vertical direction in the predetermined period of time are equal to or greater than the threshold β, the process proceeds to S310. In addition, if it is determined that any of the motion vectors in the vertical direction in the predetermined period of time is not equal to or greater than the threshold β, the process proceeds to S312.

In S310, a process of determining whether all of the motion vectors in the approach direction and the horizontal direction in the predetermined period of time are smaller than or equal to the threshold α is performed. If it is determined that all of the motion vectors in the approach direction and the horizontal direction in the predetermined period of time are smaller than or equal to the threshold α, the process proceeds to S311. In S311, a process of setting the movement pattern of the subject as linear movement in the vertical direction is performed. In addition, if it is determined that any of the motion vectors in the approach direction and the horizontal direction in the predetermined period of time is not smaller than or equal to the threshold α, the process proceeds to S305, and a process of setting the movement pattern of the subject as irregular movement is performed.

In S312, a process of determining whether all of the motion vectors in the three directions in the predetermined period of time are smaller than or equal to the threshold α is performed. If it is determined that all of the motion vectors in the three directions in the predetermined period of time are smaller than or equal to the threshold α, the vectors are in the state of FIG. 6C. In this case, the process proceeds to S313 to perform a process of setting the movement pattern of the subject to a stationary state. In addition, if it is determined that any of the motion vectors in the three directions in the predetermined period of time is not smaller than or equal to the threshold α, the process proceeds to S305, and a process of setting the movement pattern of the subject as irregular movement is performed. After the processes of S304, S305, S308, S311, and S313, the series of processes ends.

According to the present embodiment, in the scene in which the plurality of subjects are performing the linear movement in the same direction in a group, the lead subject can be determined and decided as a main subject. Therefore, it is possible to provide the imaging apparatus that can determine a main subject more suitable for the intention of a photographer in a photographing scene of sport typified by athletics, or the like. Further, the present invention is not limited to being applied to the above-described embodiment. In the lead subject decision process, for example, various kinds of information including not only a size of an image area and a position but also an amount of change in motion vectors, facial expressions, and the like of subjects can be used. In addition, by using not only motion vectors but also information indicating the orientation of faces in the linear movement direction determination process, the movement direction can be determined more accurately.

Second Embodiment

Next, a second embodiment of the present invention will be described. An imaging apparatus that has a function of detecting and tracking the face and the pupils of a person, an animal, a vehicle, and the like and can determine a main subject according to an intention of a photographer in a movement scene, and the like will be exemplified. In order to clarify which subject the imaging apparatus has chosen as a photographing target, a face frame, a pupil frame, an animal-specific frame, or the like is generally displayed for a subject serving as a tracking target. When the photographer sees the display of the frame, he or she can ascertain whether the imaging apparatus has reliably captured the desired subject and perform photographing with confidence.

However, if a display frame for a subject to be photographed disappears immediately when the subject is lost to sight (which will be referred to as a "non-visible state"), another display frame is displayed immediately after the display frame disappears in a case where the non-visible state is instantaneous. If this phenomenon repeats, the display turns into one that is very difficult for users to view, and for this reason, there is a method of appropriately setting a holding time in which the non-visible state of the subject is likely to return to a trackable state.

A time in which frame display is continued even in the non-visible state is determined uniquely to a type and a portion of a subject, and the display is likely to be display that does not necessarily match an intention of a photographer. In addition, it is not possible to let the photographer to know the current state only with continuation or elimination of the display frame. Because the photographer is not able to identify whether a subject can be tracked or the subject is in the non-visible state by viewing the current display frame, he or she is likely to hesitate about determining whether the subject may be continuously captured as it is.

Thus, in the present embodiment, a process of notifying a photographer of a state determined by the imaging apparatus and a process of displaying a frame according to an intention of the photographer will be described in detail. Further, details of matters of the present embodiment similar to those of the first embodiment will be omitted by using the reference numerals and symbols that are used for the matters, and main differences will be described.

Figure 8:
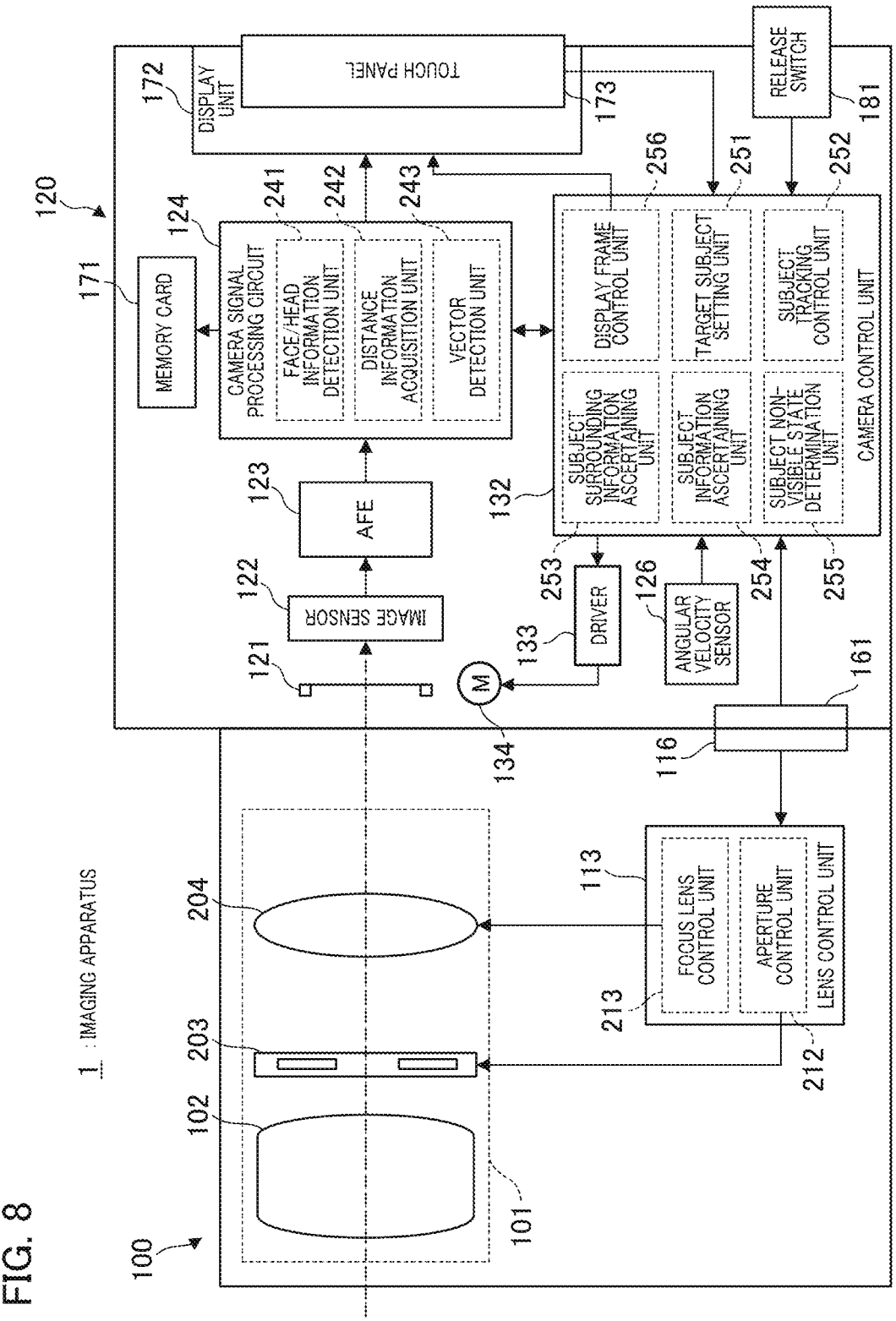
FIG. 8 is a block diagram illustrating a configuration of an imaging apparatus according to a second embodiment.

FIG. 8 is a diagram illustrating a configuration example of an imaging apparatus 1 according to the present embodiment. A configuration example of a mirrorless camera with the subject face detection function will be introduced. A photographing lens unit 101 of an interchangeable lens 100 that can be attached to a body part 120 includes a main imaging optical system 102, an aperture 203, and a focus lens group 204 that adjusts the focus. A lens control unit 113 includes an aperture control unit 212 that controls operations of the aperture 203 and a focus lens control unit 213 that controls operations of the focus lens group 204. The focus lens group 204 moves in the optical axis direction of the photographing lens unit 101 according to a control signal from the focus lens control unit 213 to adjust the focus.

Although FIG. 8 illustrates a single focus lens as an example of the interchangeable lens to simplify the illustration, the lens control unit 113 acquires focal distance information from output of an encoder for detecting a position of a zoom lens if the zoom lens can change a focal distance. In a case of an interchangeable lens with an image blur correction function, the lens control unit 113 controls driving of a shift lens group for correcting image blur. The interchangeable lens 100 is electrically connected to the body part 120 via a mount contact point part 116.

An image sensor 122 included in the body part 120 outputs an imaging signal to an analog signal processing circuit 123. A signal processed by the analog signal processing circuit 123 is sent to a camera signal processing circuit 124. A camera control unit 132 controls driving of a shutter 121 to control an imaging operation according to an operation input signal of a release switch 181, or the like, operated by a photographer. Data of an image captured according to a pressing state of the release switch 181 is stored in a memory card 171.

An angular velocity sensor 126 is a gyro sensor that detects a motion of the body part 120 of the imaging apparatus 1. The camera control unit 132 acquires an output signal of the angular velocity sensor 126 to control the camera according to shake detection information. Although the example in which the body part 120 includes the angular velocity sensor 126 has been introduced in the present embodiment, there may be a form in which the interchangeable lens 100 includes an angular velocity sensor. In addition, there may be a form in which each of the body part 120 and the interchangeable lens 100 includes an angular velocity sensor.

A display unit 172 includes a display device that displays an image so as to be monitored at the time of photographing and the captured image. A touch panel 173 is an operation input device with which a photographer can designate coordinates on the display unit 172 using his or her finger or a stylus and can be integrated with a display screen unit of the display unit 172. For example, the touch panel 173 is a built-in (in-cell) device configured such that a light transmittance does not interfere with display of the display unit 172 and configured to be incorporated into the display surface of the display unit 172. A graphical user interface (GUI) is configured in a way that coordinates input on the touch panel 173 correspond to coordinates displayed on the display unit 172. A user can input an operation as if he or she were directly operating the screen displayed on the display unit 172. Data of operation states of the touch panel 173 is managed by the camera control unit 132.

The camera control unit 132 of the body part 120 and the lens control unit 113 of the interchangeable lens 100 perform serial communication at a predetermined timing via the mount contact point parts 116 and 161. For example, the camera control unit 132 transmits focus lens drive information, aperture drive information, and the like to the lens control unit 113, and the lens control unit 113 transmits optical information such as a focal distance to the camera control unit 132.

The camera signal processing circuit 124 includes a face/head information detection unit 241, a distance information acquisition unit 242, and a vector detection unit 243. The face/head information detection unit 241 detects a specific portion (the face, the head, etc.) of a subject based on an acquired image signal.

The distance information acquisition unit 242 acquires a distribution of an amount of defocus for the entire screen or a predetermined area with respect to the position of the focus plane in the current focus detection state. Examples of distance information or depth information indicating a depth of a subject in the depth direction include an image shift amount map and a defocus amount map. The image shift amount map is calculated from a plurality of viewpoint images with different viewpoints. In an imaging plane phase difference detection method using a pupil division-type image sensor, for example, a plurality of pixel signals are acquired from a pixel unit having a plurality of microlenses and a plurality of photoelectric conversion units corresponding to each of the microlenses, and thus data of viewpoint images can be acquired. The defocus amount map is calculated by multiplying an image shift amount by a predetermined conversion factor. A distance map or a distance image in which an amount of defocus is converted into distance information of a subject indicates a distance distribution in a captured image. Information of a distance image is two-dimensional information in which a value indicated by each pixel represents distance information of a subject present in an area of a captured image corresponding to the pixel. The distance information acquisition unit 242 can acquire information of a distance distribution and a depth distribution in a captured image.

The vector detection unit 243 divides the screen into a predetermined number of areas and detects a motion vector of each of the divided areas. The information acquired by each of the face/head information detection unit 241, the distance information acquisition unit 242, and the vector detection unit 243 is sent to the camera control unit 132.

The camera control unit 132 includes a target subject setting unit 251, a subject tracking control unit 252, a subject surrounding information ascertaining unit 253, a subject information ascertaining unit 254, a subject non-visible state determination unit 255, and a display frame control unit 256.

The target subject setting unit 251 sets a target subject (which will also be referred to as a "main subject" below) based on face/head information detected by the face/head information detection unit 241. The subject tracking control unit 252 controls tracking of the target subject using the face/head information of the target subject set by the target subject setting unit 251, distance information acquired by the distance information acquisition unit 242, and the like. The subject surrounding information ascertaining unit 253 performs a process of ascertaining defocus information of the surroundings of the target subject from the information acquired by the distance information acquisition unit 242. The subject information ascertaining unit 254 performs a process of ascertaining a detection/tracking state of the main subject.

The subject non-visible state determination unit 255 performs a process of determining whether the main subject is in a non-visible state. The display frame control unit 256 controls display of a detection/tracking frame corresponding to the face/head information being detected and tracked on the screen of the display unit 172. The camera control unit 132 controls the detection/tracking frame displayed on the display unit 172 based on a detection result of the face/head information, an acquisition result of distance information, or the like sent from the camera signal processing circuit 124.

Figure 9:
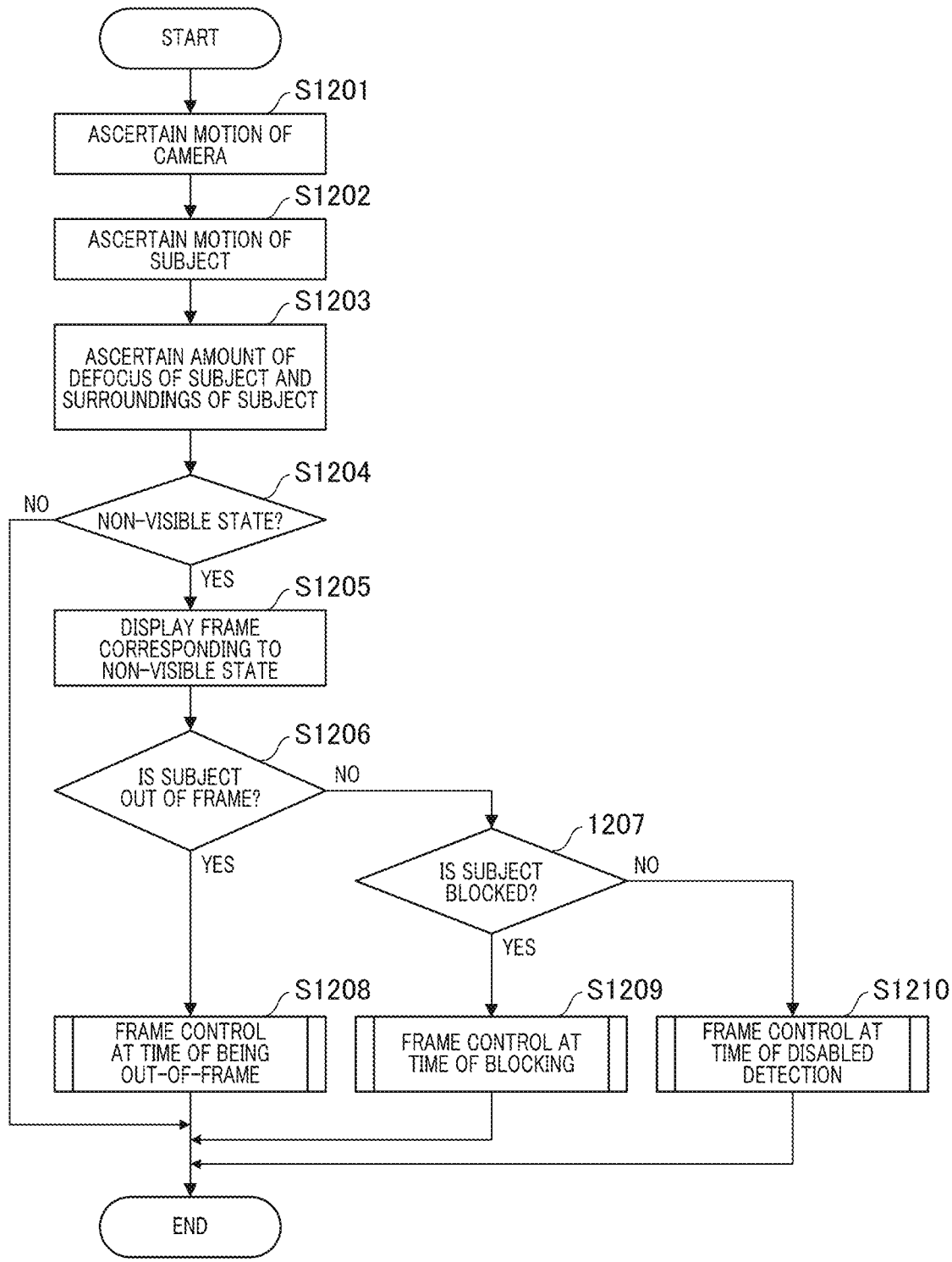
FIG. 9 is a flowchart explaining an operation of the imaging apparatus according to the second embodiment.

FIG. 9 is a flowchart explaining an operation performed by the camera control unit 132. The process of FIG. 9 is performed each time an image for each frame is generated from when the face (head) of a person who is a main subject is first detected until the state transitions to a non-visible state thereafter.

In S1201 of FIG. 9, a process of ascertaining a motion of the imaging apparatus 1 is performed. The angular velocity sensor 126 acquires motion information of the imaging apparatus 1, and a process of ascertaining is performed to determine how the photographer moved the imaging device 1 using this information. The motion information of the imaging apparatus 1 is stored in a predetermined memory.

Next in S1202, the camera control unit 132 performs a process of ascertaining a motion of a subject within the angle of view using vector information and the like. The target subject setting unit 251 sets a specific subject within the angle of view and stores motion information thereof in the memory. Next in S1203, the surrounding information ascertaining unit 253 performs a process of ascertaining an amount of defocus of the main subject and the surrounding area of the subject and stores information of the change thereof in the memory. The information acquired from S1201 to S1203 is used in determination made after the subject enters a non-visible state. The process proceeds to S1204 next to S1203.

In S1204, the subject non-visible state determination unit 255 determines whether the subject is in the non-visible state. If it is determined that the subject is in the non-visible state in S1204, the process proceeds to S1205, and if it is determined that the subject is not in the non-visible state, the process ends.

In S1205, the display frame control unit 256 changes the display of the frame for the subject to display for the non-visible state. For example, the color of the displayed frame is changed, or the frame line is changed from a solid line to a dashed line. Any change method is applicable as long as it enables the photographer to identify the change in the display frame and does not impair the visibility of the information displayed on the display unit 172.

The reasons that cause the subject to be in the non-visible state can be broadly divided into three. The first reason is that the main subject to be photographed is out-of-frame of the angle of view. The second reason is that the main subject is blocked by an obstacle. Examples of the obstacle include a vehicle crossing in front of the photographer and a shadow of a building and the like casting over the person who is a tracking target. The third reason is the performance of the detector that causes detection or tracking of the main subject to be disabled. For example, there is a case where a person who is the main subject is too far away that the size of the face image becomes smaller than the minimum detectable size. Each cause of the non-visible state needs to be appropriately controlled.

After S1205, the process proceeds to S1206, and the subject non-visible state determination unit 255 performs a process of determining whether the main subject is out of the frame with respect to the first reason. This determination process can be performed based on whether the main subject has moved to an end of the angle of view and entered the non-visible state. If it is determined that the main subject is out of the frame, the process proceeds to S1208, and if it is determined that the main subject is not out of the frame, the process proceeds to S1207.

In S1207, the subject non-visible state determination unit 255 determines whether the subject is blocked by another object, as a situation in which the subject is in the non-visible state with regard to the second reason. For example, the determination can be made by ascertaining whether the amount of defocus of the surrounding area of the subject has suddenly changed to the closest side when the non-visible position of the subject is a location within a predetermined range from the center position in the angle of view and the subject became non-visible. In a case where the subject enters the non-visible state while moving, it can be determined by detecting the change in the amount of defocus of the subject in the movement direction. In addition, in a case where a car or the like crosses in front of a person who is stopped, it can be determined by detecting the change in the amount of defocus of the person in the surrounding area. The subject non-visible state determination unit 255 changes a position to ascertain the amount of defocus according to the situation of the subject and thereby determines the state in which the main subject is blocked. If it is determined that the main subject is blocked and thus in the non-visible state in S1207, the process proceeds to S1209, and if it is determined that the main subject is not blocked, the process proceeds to S1210.

In S1208, the display frame control unit 256 performs frame control suitable for the non-visible state when the subject is out of the frame and then ends the series of processes. In addition, in S1209, the display frame control unit 256 performs display frame control suitable for the non-visible state when the main subject is shielded, in other words, for the situation in which the main subject is blocked. Then, the series of processes ends. In addition, in S1210, the display frame control unit 256 performs display frame control for the case where detection of the main subject is disabled. If it is determined that the main subject is not blocked in S1207, it is determined that the state has changed to the situation in which detection of the main subject is disabled (the third reason), thus the process of S1210 is executed, and then the series of processes ends.

Figure 10:
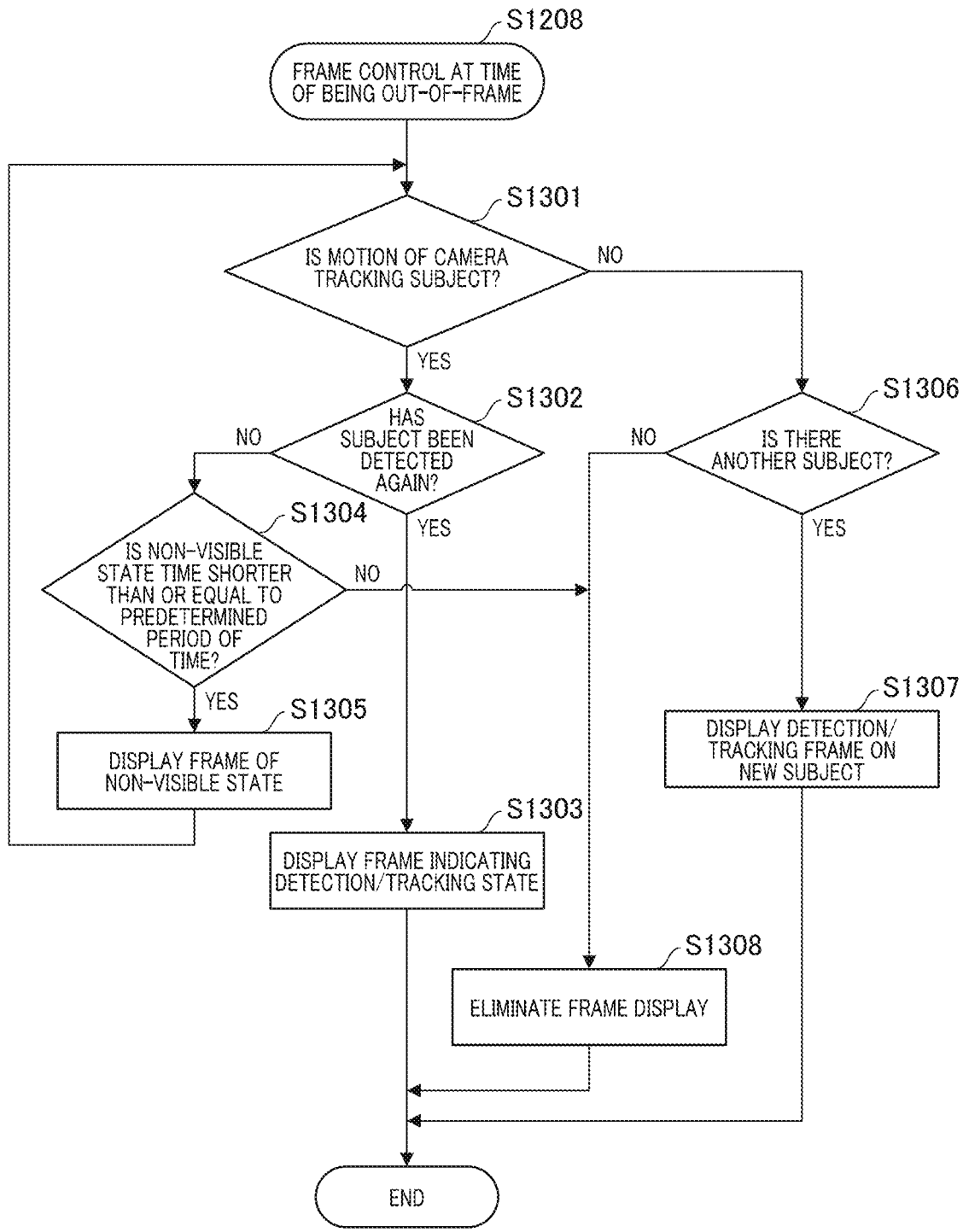
FIG. 10 is a flowchart explaining frame control at the time of being out-of-frame.
Figure 11:
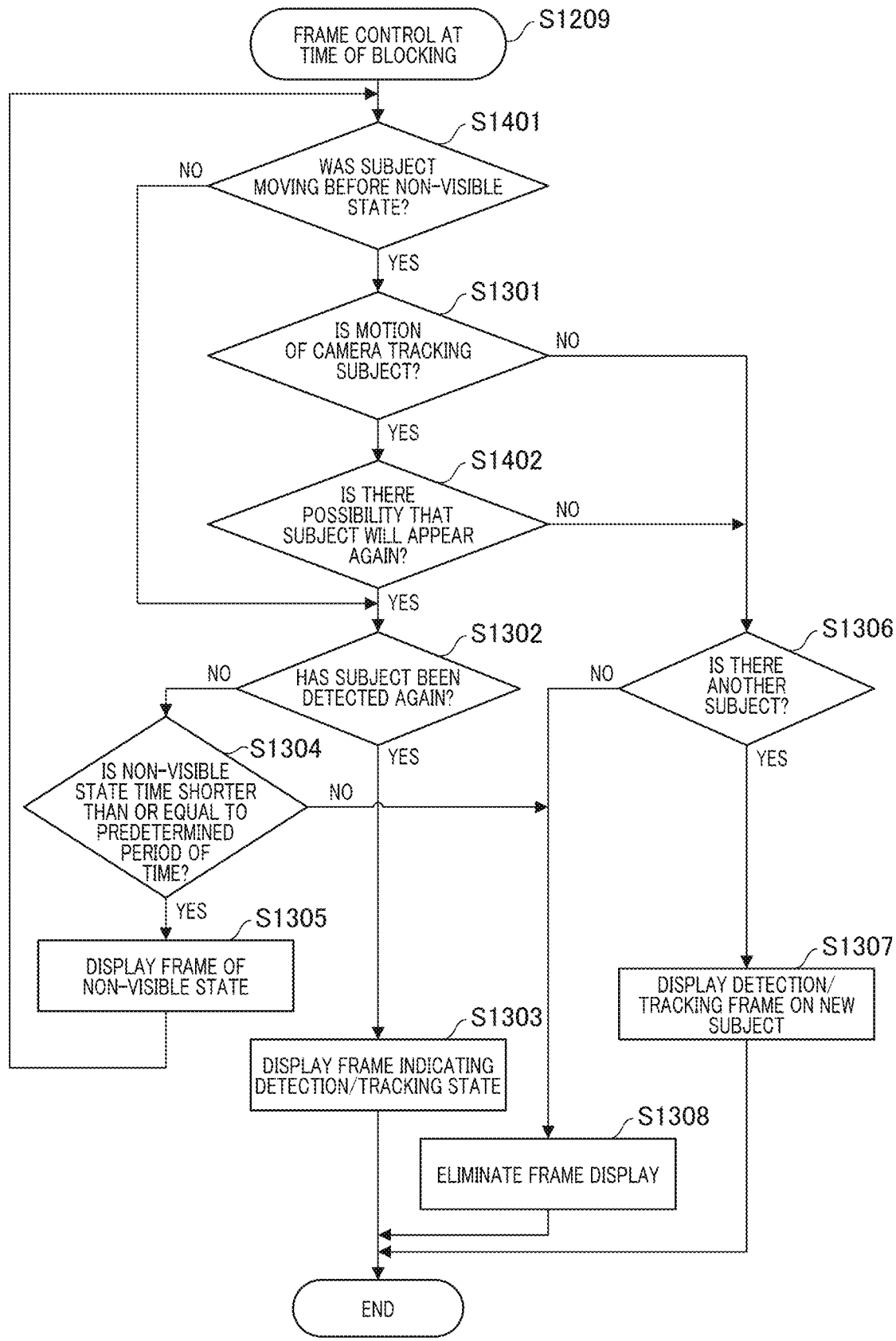
FIG. 11 is a flowchart explaining frame control at the time of blocking.
Figure 12:
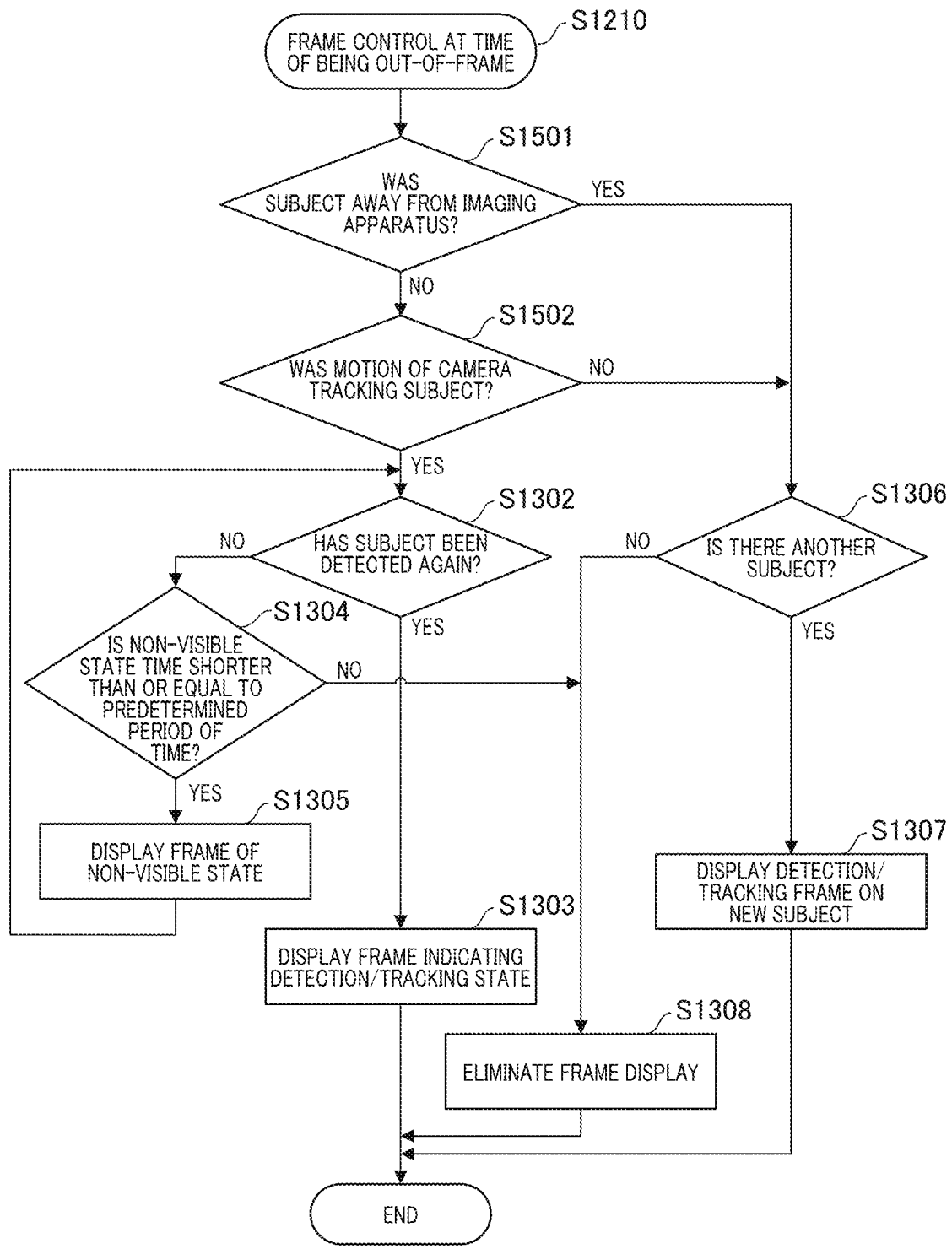
FIG. 12 is a flowchart explaining frame control when detection is disabled.

FIGS. 10 to 12 are flowcharts explaining the display frame control according to the non-visible state of the subject. FIG. 10 is a flowchart explaining frame control when the non-visible state occurs due to being out-of-frame of the main subject. S1208 (frame control at the time of being out-of-frame) of FIG. 9 will be described in detail.

S1301 of FIG. 10 is a process of determining whether the photographer is tracking the subject. This determination process is performed based on the motion of the camera ascertained in S1201 of FIG. 9 and the motion of the subject in the angle of view ascertained in S1202 of FIG. 9. It is possible to determine that the photographer is tracking the subject when the photographer is moving the imaging apparatus 1 and the change in the position of the image of the main subject is smaller than the amount of the movement of the imaging apparatus. In addition, when the subject is tracked until the subject is out of the frame and the movement direction of the imaging apparatus 1 does not change after being out-of-frame, it is determined that the photographer is no longer tracking the subject that he or she intended. If it is determined that the photographer is tracking the subject with the imaging apparatus 1 in S1301, the process proceeds to S1302. If it is determined that the photographer is not tracking the subject, the process proceeds to S1306.

S1302 is a process of determining whether the main subject being tracked has been detected again. The subject information ascertaining unit 254 performs a process of ascertaining whether the main subject has been detected again. If it is determined that the main subject has been detected again, the process proceeds to S1303, and if it is determined that the main subject has not been detected again, the process proceeds to S1304.

The display frame control unit 256 controls display of the detection/tracking frame again in S1303, and then the process ends. In addition, in S1304, a process of determining whether a predetermined period of time has passed after the non-visible state of the subject occurred is performed. The predetermined period of time is a threshold time of a non-visible state continuation time. If it is determined that the predetermined period of time has not passed after the occurrence of the non-visible state in S1304, the process proceeds to S1305, and if it is determined that the predetermined period of time has passed after the occurrence of the non-visible state, the process proceeds to S1308.

After the display frame control unit 256 continues displaying the frame for the non-visible state (frame fixing display) in S1305, the process returns to S1301. In addition, after the display frame control unit 256 performs a frame display elimination process in S1308, the series of processes ends.

On the other hand, a process of determining whether a subject different from the main subject that had been tracked until then has been newly detected is performed in S1306. If it is determined that a different subject has been detected, the process proceeds to S1307, and if it is determined that a different subject has not been detected, the process proceeds to S1308. The display frame control unit 256 controls display of the detection/tracking frame for the newly detected subject in S1307, and then the series of processes ends.

When the main subject that has been tracked is out of the frame as described above, the process is immediately switched to a process of waiting for re-detection or a process of searching for a new subject depending on whether the photographer is still tracking the main subject. Therefore, control to transition to the display frame more suitable for the intention of the photographer can be performed.

FIG. 11 is a flowchart explaining control when the non-visible state occurs due to another object or the like blocking the subject. S1209 (frame control at the time of blocking) of FIG. 9 will be described in detail. With respect to the major difference between the case where the non-visible state of the main subject occurs due to being out-of-frame described in FIG. 10 and the case where the non-visible state occurs due to the main subject in the blocked state, whether the main subject in the non-visible state can be detected again can be determined in the latter case. With respect to the result of the determination of whether the main subject is blocked in S1207 of FIG. 9, it is assumed that the photographer did not move the imaging apparatus 1 and the main subject did not move before the occurrence of the non-visible state. Because it is inferred in this situation that a vehicle or the like has crossed in front of the main subject, the main subject is highly likely to be detected again. In addition, it is assumed that the photographer moves the imaging apparatus 1 tracking the subject. If the amount of defocus in the shaking direction of the imaging apparatus 1 indicates a value indicating the closest side to an end of the angle of view, it is inferred that the object blocking the main subject is large and the main subject would not be detected again.

In FIG. 11, a process of determining whether the subject is to be detected again is performed in S1401 and S1402. Because processes other than these are the same as those in FIG. 10, detailed description thereof will be omitted by using the step numbers used in FIG. 10. This way of omission is the same as in the following flowcharts.

In S1401 of FIG. 11, a process of determining whether the main subject was moving before entering the non-visible state is performed. If it is determined that the main subject was moving before entering the non-visible state, the process proceeds to S1301, and if it is determined that the main subject was not moving before entering the non-visible state, the process proceeds to S1302. If it is determined that the subject was being tracked in S1301, the process proceeds to S1402, and if it is determined that the subject was not being tracked, the process proceeds to S1306.

In S1402, a process of determining whether the main subject that has entered the non-visible state from the blocking state can be detected again is performed. If it is determined that the main subject can be detected again, the process proceeds to S1302, and if it is determined that the main subject cannot be detected again, the process proceeds to S1306.

The main subject can be detected again when the process proceeds to S1302. In S1302, a process of determining whether the main subject has been detected again is performed. Because the processes from S1302 are the same as those for the frame control at the time of being out-of-frame in FIG. 10, detailed description thereof will be omitted.

FIG. 12 is a flowchart explaining control when the non-visible state of the subject occurs because a detection limit is exceeded. S1210 (frame control at the time of disabled detection) of FIG. 9 will be described in detail. Because whether the main subject can be detected again can be determined also in FIG. 14, the latter half of the processes shown in FIG. 12 is similar to that of FIG. 10.

In S1501 of FIG. 12, a process of determining whether the main subject was away from the imaging apparatus 1 before entering the non-visible state is performed. Whether the main subject was far from the imaging apparatus 1 can be determined using main subject distance information output by the distance information acquisition unit 242. If it is determined that the main subject was not far from the imaging apparatus 1 before entering the non-visible state, the process proceeds to S1502. If it is determined that the main subject was far from the imaging apparatus 1 before entering the non-visible state, it is inferred that the main subject moved far beyond the detection limit and it is determined that the main subject will not be detected again, and the process proceeds to S1306.

In S1502, a process of determining whether the photographer was tracking the main subject with the imaging apparatus 1 is performed. A case where the main subject enters in the non-visible state while the photographer is tracking the main subject with the imaging apparatus 1 means that it is not able to detect the main subject suddenly. It is conceivable that, for example, a state in which it is not able to detect the main subject occurs accidentally for some reason and the non-visible state of the main subject occurs. In other words, if it is determined that the main subject was being tracked in S1502, it can be determined that the main subject is highly likely to be detected again, and thus the process proceeds to S1302. In addition, if it is determined that the photographer was not tracking the main subject with the imaging apparatus 1 in S1502, it can be determined that the photographer intended to photograph another subject, and thus the process proceeds to S1306. The same processes as those of FIG. 10 are performed from S1302 and S1306.

With the above-described processes, the display frame control according to an intention of the photographer is possible. Re-detection may be awaited if it is determined that the photographer is tracking the main subject with the imaging apparatus, and the next detection can be prepared immediately if it is determined that the photographer is not tracking the main subject.

In the present embodiment, when the main subject non-visible state occurs, the photographer is notified of the occurrence of the non-visible state, and the control of the display frame is changed according to the non-visible state. Thus, the photographer can ascertain the current situation of the detection and tracking of the subject. Furthermore, the following display frame control is changed according to whether the photographer is tracking the main subject with the imaging apparatus and the condition for the non-visible state, and thus the frame can be displayed according to the intention of the photographer.

Modified Example 1 of Second Embodiment

Next, modified example 1 of the second embodiment will be described. In modified example 1, it is assumed that the imaging apparatus continues displaying the frame indicating a subject being in the non-visible state with the intention of the photographer when the subject non-visible state occurs. In this case, a process of notifying the photographer of how long the display of frame will be continued and how long the frame will be displayed from now on is performed.

Figure 13:
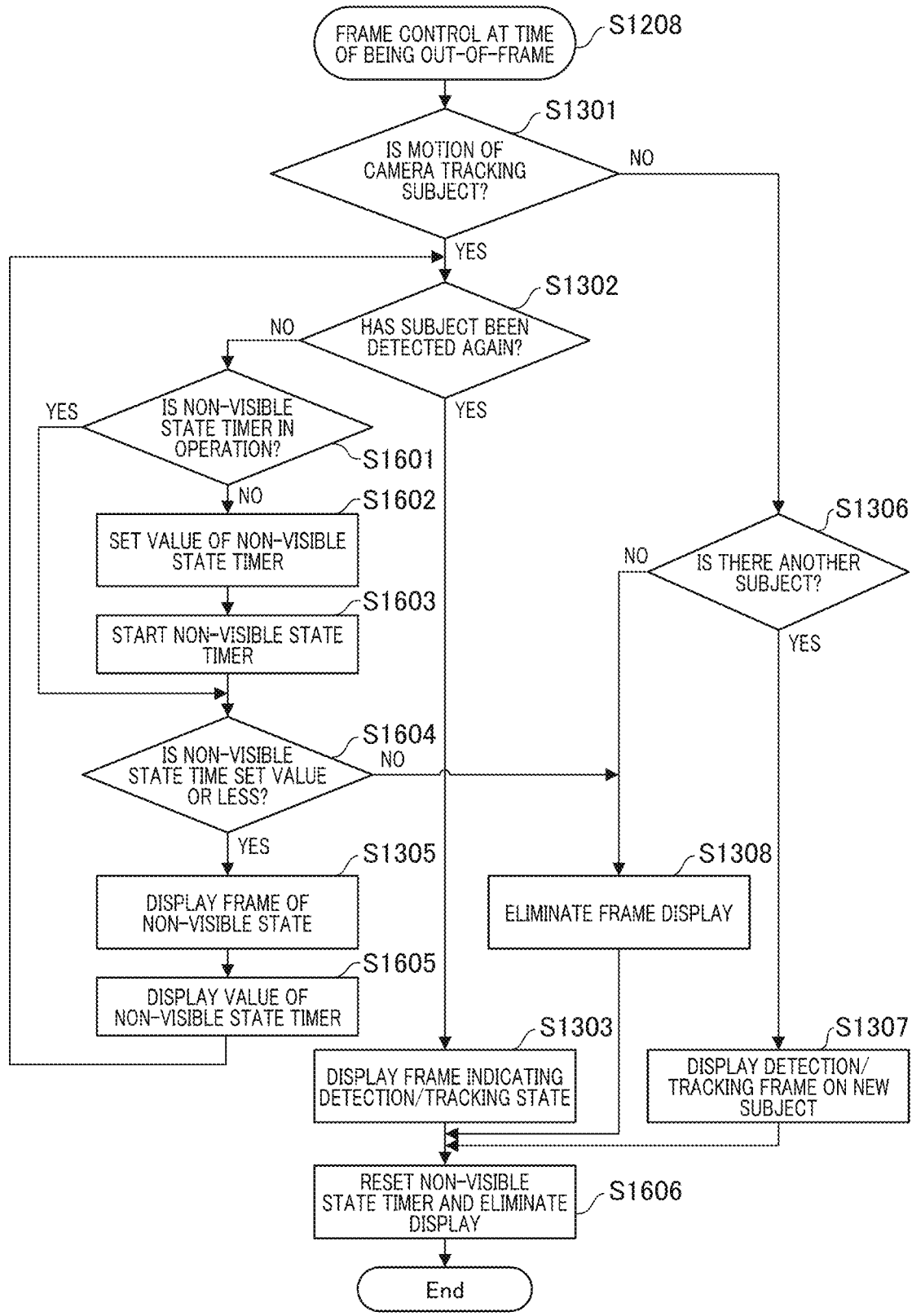
FIG. 13 is a flowchart explaining an operation of modified example 1 of the second embodiment.

FIG. 13 is a flowchart explaining an operation of modified example 1. Processes of S1601 to S1606 are added to FIG. 10. The processes of S1301 to S1303 and S1305 to S1308 of FIG. 13 are the same as those of FIG. 10.

If it is determined that it is not able to detect the subject again in S1302, the process proceeds to S1601. In S1601, the camera control unit 132 determines whether a non-visible state timer that measures duration of the non-visible state is in operation. If it is determined that the non-visible state timer is not in operation, the process proceeds to S1602, and if it is determined that the non-visible state timer is in operation, the process proceeds to S1604.

After the camera control unit 132 performs a non-visible state timer value setting process in S1602, the process proceeds to S1603. The time value set for the non-visible state timer in S1602 is, for example, about two second and is changed according to a situation. Even if it is determined that the imaging apparatus 1 is tracking the main subject, for example, re-detection becomes easier as an amount of motion (difference) of the main subject becomes smaller. In such a case, the time value set for the non-visible state timer can be set to be longer. Here, the difference refers to a difference in position between images of the same subject with different times, can be obtained by calculating how much the position of the subject moved within the angle of view. The camera control unit 132 can acquire and ascertain the amount of motion from the vector detection unit 243.

The non-visible state timer starts operating in S1603 next to S1602, and the process proceeds to S1604. After the non-visible state timer starts operating or when the non-visible state timer is in operation, a process of determining whether the duration of the non-visible state (non-visible state time) has a set value or less is performed in S1604. If it is determined that the non-visible state time is less than or equal to the set value of the non-visible state timer, the process proceeds to S1305, and if it is determined that the non-visible state time exceeds the set value, the process proceeds to S1308. After the display frame control unit 256 performs a process of displaying the frame of the non-visible state in S1305, the process proceeds to S1605, and a process of displaying the value of the non-visible state timer is performed. The process proceeds to S1302 after the process of S1605.

On the other hand, if it is determined that the non-visible state time exceeds the set value of the non-visible state timer in S1604, the process proceeds to S1308. In other words, in a case where it was not able to detect the subject again even after the set time had passed, it is determined that the main subject is not likely to be detected again thereafter. After the frame display is eliminated in S1308, the process proceeds to S1606.

After the process of S1308, a non-visible state timer reset process and a timer value display elimination process are performed in S1606, and then the series of processes ends.

In addition, even when the subject is detected again and the frame indicating the detection/tracking state is displayed (S1303) and when the detection/tracking frame is displayed on a new subject (S1307), the reset process and the display elimination process are performed in S1606.

Figure 14A:
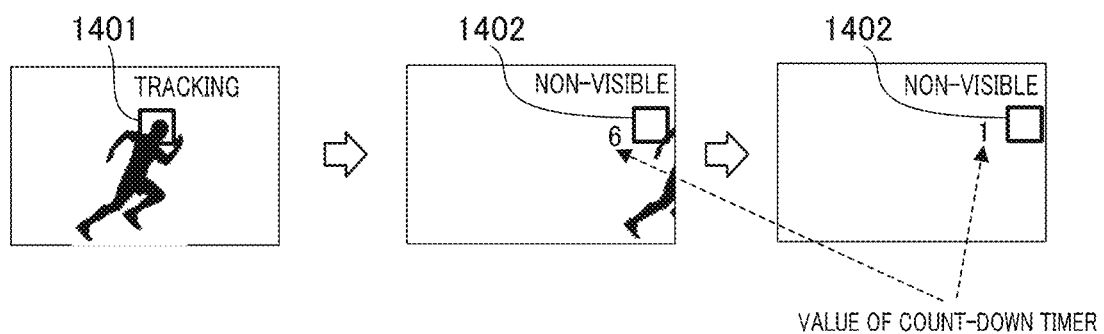
FIGS. 14A and 14B are diagrams illustrating examples of frame display.

FIG. 14A is a schematic diagram illustrating display example. The left diagram illustrates an example in which a detection/tracking frame 1401 is superimposed on an image of a main subject. The central diagram illustrates an example in which the non-visible state of the main subject occurs and an image of a part of the main subject, a non-visible state frame 1402, and a non-visible state timer value "6" are displayed. The right diagram illustrates an example in which the non-visible state of the main subject continues and the non-visible state frame 1402 and a non-visible state timer value "1" are displayed. The photographer can ascertain how long does it take for the frame to be eliminated while viewing the change in the non-visible state timer value displayed in a descending manner.

In the present modified example, when the main subject non-visible state occurs and then the main subject is highly likely to be detected again, a time value is displayed close to the frame 1402 until the frame display is eliminated. Display can be performed in a state close to the intention of the photographer (to photograph the main subject) and further display of a timer value convenient for the photographer can be provided. Further, although the determination of non-visible state at the time of being out-of-frame has been described as an example, the same example may be applied to determination of non-visible state based on another reason.

Modified Example 2 of Second Embodiment

Next, modified example 2 of the second embodiment will be described. Modified example 2 introduces a process of predicting the location at which the main subject once being in the non-visible state will appear again and performing frame display in modified example 1.

A case where the main subject is under a shade of another object at the time of photographing is assumed. When the main subject crosses behind a thick pillar, for example, the non-visible state occurs while the main subject is behind the pillar, however, after the main subject passes the pillar, detection and tracking becomes possible again. In this case, the camera control unit 132 can predict the location (position within the image) and the time at which the main subject will be able to be detected again based on the distance to the main subject, the distance to the pillar, the width of the pillar, and the movement speed of the main subject.

Figure 15:
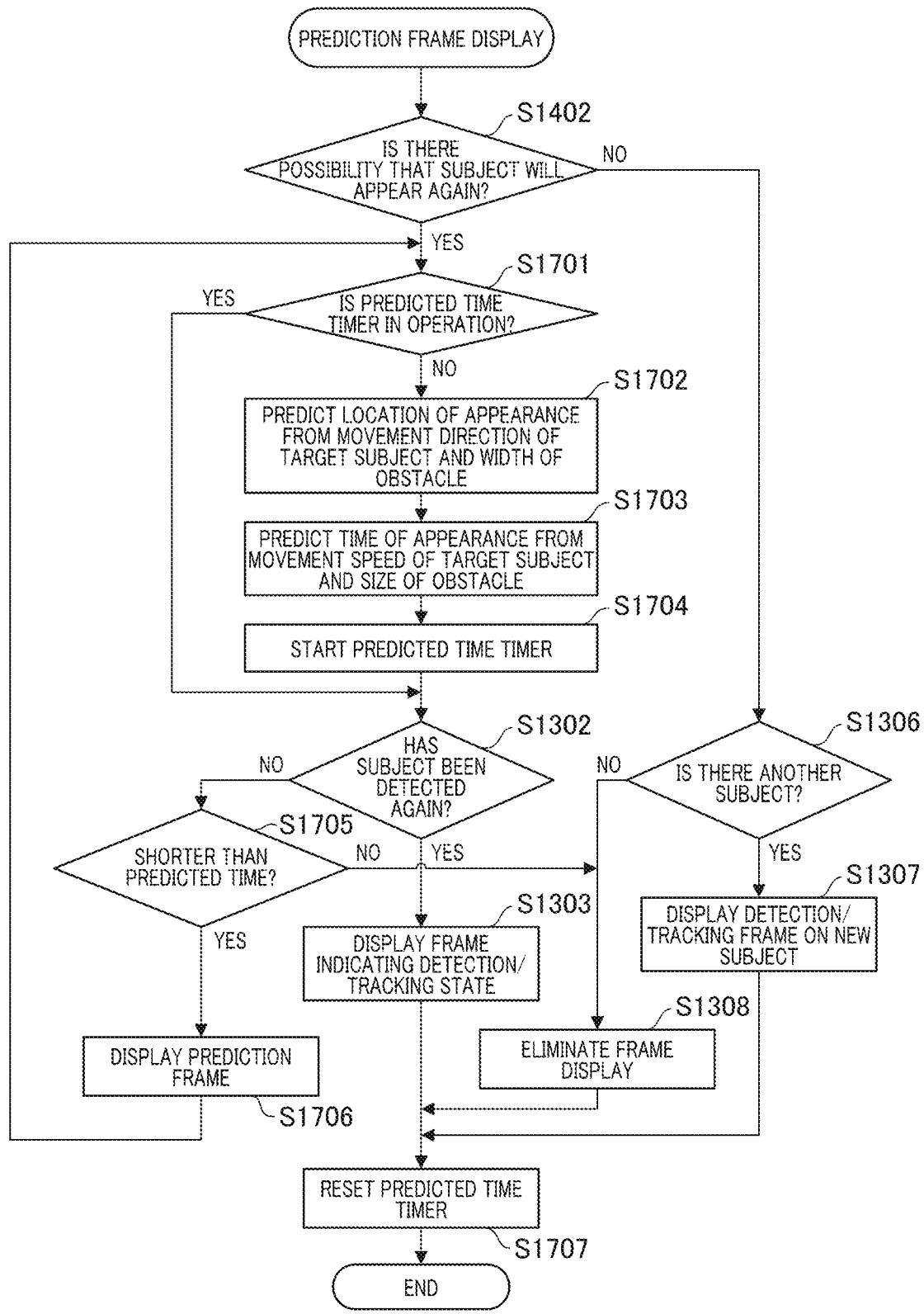
FIG. 15 is a flowchart explaining an operation of modified example 2 of the second embodiment.

FIG. 15 is a flowchart explaining an operation of modified example 2. The prediction process for the main subject to be photographed is performed limited to a situation in which the main subject is blocked by another object and moving. Thus, in FIG. 15, the prediction process (S1701 to S1707) is added at a part of the process of FIG. 11. The processes of S1402, S1302, S1303, and S1306 to S1308 are the same as those of FIG. 11.

In S1402 of FIG. 15, the camera control unit 132 determines whether there is a possibility that the main subject in the non-visible state will appear again. If it is determined that there is a possibility that the main subject will appear again, the process proceeds to S1701, and if there is no or a low possibility, the process proceeds to s1306.

In S1701, the camera control unit 132 performs a process of determining whether a predicted time timer is in operation. The predicted time timer is a timer that measures a time until the main subject is predicted to appear again. If it is determined that the predicted time timer is not in operation, the process proceeds to S1702, and if it is determined that the predicted time timer is in operation, the process proceeds to S1302.

The camera control unit 132 performs the prediction process for the main subject based on distance information, and the like in S1702 and S1703. In S1702, a process of predicting the location of the blocking object from which the main subject will appear using the movement direction of the main subject before the non-visible state occurred and the width of the object (obstacle) blocking the main subject is performed. Next in S1703, a process of predicting the time until the main subject will appear again using the movement speed of the main subject and the size of the blocking object is performed. As information necessary for the prediction in S1702 and S1703, the movement direction and the movement speed of the main subject can be calculated using motion information of the imaging apparatus (output of the angular velocity sensor 126) and motion information of the subject in the angle of view (output of the vector detection unit 243). In addition, the information of the width of the object blocking the main subject can be acquired by the surrounding information ascertaining unit 253.

The process proceeds from S1703 to S1704, then an operation of the predicted time timer starts in S1704, and then the process proceeds to S1302. If the main subject has been detected again in S1302, the process proceeds to S1303, and if the main subject has not been detected again, the process proceeds to S1705.

In S1705, the camera control unit 132 determines whether the predicted time has elapsed. If it is determined that the predicted time has not passed in S1705 (shorter than the predicted time), the process proceeds to S1706, and if it is determined that the predicted time has passed, the process proceeds to S1308. In S1706, the display frame control unit 256 controls display of a prediction frame at the position predicted in S1702. Then, the process returns to S1701 and the prediction frame display process is continued.

On the other hand, if it is determined that the predicted time has passed in S1705, it is determined that the possibility that the main subject will appear again is low, then the process proceeds to S1308, and the display frame control unit 256 performs a process of eliminating the frame display. Then, the process proceeds to S1707.

If there is no possibility that the main subject in the non-visible state will appear again in S1402 of FIG. 15, the process similar to that of FIG. 11 is performed. However, if display is performed without the prediction frame, the process proceeds to S1303 or S1307 and then to S1707. A reset process for the predicted time timer is performed in S1707 to prepare occurrence of the next non-visible state of the subject, and then the series of the processes ends.

In the present modified example, where the main subject will appear next can be predicted after the occurrence of the non-visible state of the main subject, and the photographer can be notified of the prediction by displaying the prediction frame at the predicted position. This will be described in detail with reference to FIG. 14B.

Figure 14B:
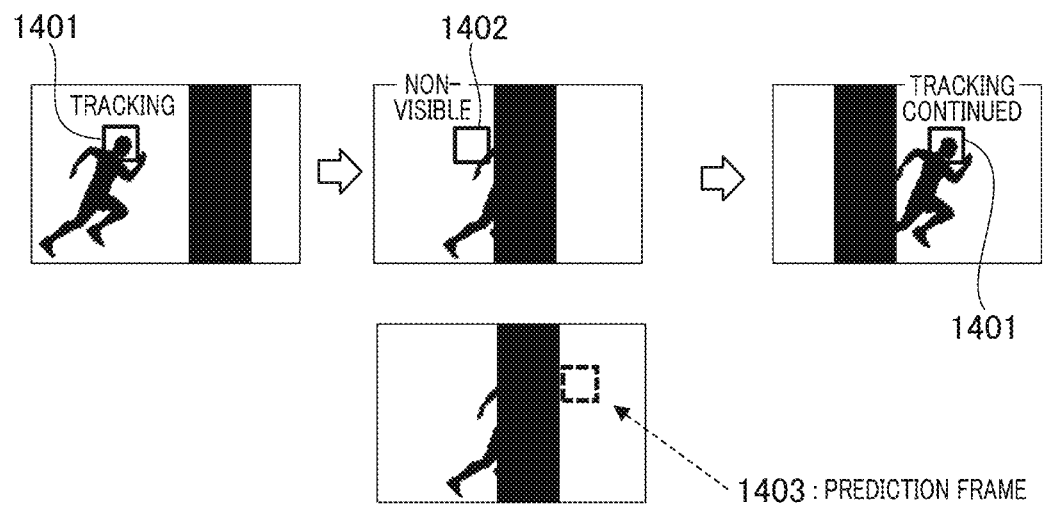

FIG. 14B is a schematic diagram illustrating a display example of the prediction frame. The left diagram illustrates an example in which an image in which the detection/track frame 1401 is superimposed on an image of the main subject and an image of an obstruction (the black rectangular portion) are displayed. The two central diagrams illustrate a situation in which the non-visible state of the subject has occurred. The upper diagram illustrates a partial image of the main subject and a frame 1402 in the non-visible state, and the image of the obstruction, and the lower diagram illustrates the partial image of the main subject, the image of the obstruction, and a prediction frame 1403. The right image illustrates the image of the obstruction and an image in which the detection/tracking frame 1401 is superimposed on an image of the re-detected main subject, indicating the tracking of the main subject is being continued.

The detection/tracking frame 1401 of the main subject is displayed according to the intention of the photographer before the non-visible state of the main subject occurs, the frame 1402 is displayed at the time when the non-visible state occurs, and further the prediction frame 1403 is displayed. Thus, a useful indicator indicating what kind of photographing behavior the photographer should take next can be presented, and display control convenient for the photographer can be realized.

Although the second embodiment and modified examples 1 and 2 have been described in detail, the present invention is not limited to a specific embodiment and can be implemented in various modes. If a detection state or a tracking state of the main subject can be distinguished from the non-visible state of the main subject, for example, a display method may be differentiated in a live view state (a state in which the main subject is observed from the display unit) and a photographing preparation state (a state in which the release button is half-pressed).

According to the above-described embodiments, the imaging apparatus that can dynamically determine the main subject as a tracking target in a movement scene of a plurality of subjects, or the like according to an intention of the photographer and notify the user of the situation of detection and tracking of the main subject can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-116449, filed Jul. 6, 2020 which is hereby incorporated by reference wherein in its entirety.

What is claimed is:

1. A subject tracking device that detects a subject from a captured image and controls tracking of the subject, the subject tracking device comprising:
at least one processor and at least one memory functioning as:
an acquisition unit that acquires an image signal of the image;
a first detection unit that detects a subject from an image area within the image and acquires detection information of the subject;
a second detection unit that detects an amount of a motion of the subject from the acquired image signal; and
a control unit that recognizes a movement of the subject from the detected amount of the motion of the subject and controls tracking of a main subject decided using the detection information of the subject,
wherein, when a plurality of moving subjects are detected, the control unit performs a process of deciding on a subject that is in the lead in a movement direction as the main subject,
wherein, if it is determined that a main subject as a tracking target has not been lost, the control unit controls displaying of a first display frame corresponding to a position of the main subject within the image, and if it is determined that the main subject is lost, the control unit controls changing of the first display frame to a second display frame, and wherein the control unit controls displaying of a time taken until the second display frame is eliminated using a measurement unit that measures a time from the time when the main subject is lost.

2. The subject tracking device according to claim 1, wherein, when a movement of the plurality of subjects is determined as a linear movement and a group movement, the control unit performs a process of deciding on the main subject among the plurality of detected subjects.

3. The subject tracking device according to claim 2, wherein, when it is determined that the number of the plurality of subjects performing the group movement is equal to or greater than a threshold, the control unit performs a process of deciding on the main subject among the plurality of detected subjects.

4. The subject tracking device according to claim 2, wherein, when a first subject is selected using the detection information of the subject and it is determined whether there is a group movement of the plurality of subjects made in the same movement direction as a movement direction of the first subject, if the movement is determined as the group movement, the control unit performs a process of deciding on a second subject that is in the lead of the group movement in the movement direction as the main subject.

5. The subject tracking device according to claim 4, wherein, if it is determined whether the plurality of detected subjects are in a stationary state or the movement is an irregular movement, the control unit performs a process of deciding on the first subject as the main subject and setting the first subject as a tracking target.

6. The subject tracking device according to claim 1, wherein, when a type of each subject is determined using the detection information of the subject, if the plurality of subjects performing the movement are of the same type, the control unit performs a process of deciding on the lead subject from among the plurality of subjects as the main subject.

7. The subject tracking device according to claim 1, wherein the control unit performs a process of deciding on a subject being in the lead in the movement direction from among the plurality of subjects, as the main subject, based on a size, a position, or an amount of change in the amount of motion in the image area of the detected subject.

8. The subject tracking device according to claim 1, wherein the control unit performs a process of determining a movement direction of the subject using information indicating the amount of the motion or an orientation of the face of the subject to decide on the main subject.

9. The subject tracking device according to claim 1, wherein the control unit determines a tracking state of the main subject using a detection signal of a shake detection unit that detects a shake of the subject tracking device and the amount of the motion and determines whether display of the second display frame is to be continued.

10. The subject tracking device according to claim 1, wherein the control unit controls displaying of the second display frame and a time for which display of the second display frame is to be continued.

11. The subject tracking device according to claim 1, wherein, after it is determined that the main subject is in the non-visible state, the control unit predicts a position at which the main subject will appear next and controls displaying of a third display frame at the predicted position.

12. The subject tracking device according to claim 11, wherein the control unit continues displaying of the third display frame as long as a predetermined period of time has not passed after a position at which the main subject will appear is predicted, and if the main subject is detected again, the control unit controls displaying of the first display frame.

13. The subject tracking device according to claim 1, wherein, if it is determined that the non-visible state of the main subject has occurred due to being out-of-frame, the control unit continues displaying of the second display frame as long as a predetermined period of time has not passed from the time at which the non-visible state occurred, and if the main subject is detected again, the control unit controls displaying of the first display frame.

14. The subject tracking device according to claim 1, wherein, if it is determined that the non-visible state has occurred due to blocking of the main subject and then the main subject can be tracked, the control unit continues displaying of the second display frame as long as a predetermined period of time has not passed after the non-visible state occurred, and if the main subject is detected again, the control unit controls displaying of the first display frame.

15. The subject tracking device according to claim 1, wherein, if it is determined that the non-visible state has occurred due to disabled detection of the main subject, the control unit continues displaying of the second display frame as long as a predetermined period of time has not passed after the non-visible state occurred, and if the main subject is detected again, the control unit controls displaying of the first display frame.

16. An imaging apparatus including the subject tracking device according to claim 1.

17. A subject tracking device that detects a subject from a captured image and controls tracking of the subject, the subject tracking device comprising:

at least one processor and at least one memory functioning as:

an acquisition unit that acquires an image signal of the image;

a detection unit that detects an amount of motion of a plurality of subjects from the acquired image signal; and a control unit that decides on a main subject based on a motion performed by the plurality of subjects in the same direction using the detection unit and controls tracking of the main subject, wherein, if it is determined that a main subject as a tracking target has not been lost, the control unit controls displaying of a first display frame corresponding to a position of the main subject within the image, and if it is determined that the main subject is lost, the control unit controls changing of the first display frame to a second display frame, and wherein the control unit controls displaying of a time taken until the second display frame is eliminated using a measurement unit that measures a time from the time when the main subject is lost.

18. A subject tracking method executed by a subject tracking device that detects a subject from a captured image and controls tracking of the subject, the subject tracking method comprising:

acquiring an image signal of the image;

detecting a subject from an image area within the image, acquiring detection information of the subject, and detecting an amount of a motion of the subject from the image signal; and recognizing a movement of the subject from the detected amount of the motion of the subject and controlling tracking of a main subject decided using the detection information of the subject, wherein, when a plurality of moving subjects are detected in the control of tracking, a subject that is in the lead in a movement direction is decided as the main subject;

wherein, if it is determined that a main subject as a tracking target has not been lost, the control unit controls displaying of a first display frame corresponding to a position of the main subject within the image, and if it is determined that the main subject is lost, the control unit controls changing of the first display frame to a second display frame, and wherein the control unit controls displaying of a time taken until the second display frame is eliminated using a measurement unit that measures a time from the time when the main subject is lost.

19. A subject tracking method executed by a subject tracking device that detects a subject from a captured image and controls tracking of the subject, the subject tracking method comprising:

acquiring an image signal of the image;

detecting an amount of a motion of a plurality of the subjects from the acquired image signal; and deciding on a main subject based on a motion performed by the plurality of detected subjects in the same direction and controlling tracking of the main subject;

wherein, if it is determined that a main subject as a tracking target has not been lost, the control unit controls displaying of a first display frame corresponding: to a position of the main subject within the image, and if it is determined that the main subject is lost, the control unit controls changing of the first display frame to a second display frame, and wherein the control unit controls displaying of a time taken until the second display frame is eliminated using a measurement unit that measures a time from the time when the main subject is lost.

* * * * *